US011373045B2

(12) United States Patent
Bealby-Wright et al.

(10) Patent No.: US 11,373,045 B2
(45) Date of Patent: Jun. 28, 2022

(54) DETERMINING CONTEXT AND INTENT IN OMNICHANNEL COMMUNICATIONS USING MACHINE LEARNING BASED ARTIFICIAL INTELLIGENCE (AI) TECHNIQUES

(71) Applicant: ContactEngine Limited, Hertford (GB)

(72) Inventors: Dominic Bealby-Wright, London (GB); Cosmin Dragos Davidescu, Cambridge (GB)

(73) Assignee: CONTACTENGINE LIMITED, Hertford (GB)

( * ) Notice: Subject to any disclaimer, the term of this patent is extended or adjusted under 35 U.S.C. 154(b) by 478 days.

(21) Appl. No.: 16/581,048

(22) Filed: Sep. 24, 2019

(65) Prior Publication Data
US 2021/0089624 A1   Mar. 25, 2021

(51) Int. Cl.
| G06F 40/30 | (2020.01) |
| G10L 15/18 | (2013.01) |
| G06N 5/02 | (2006.01) |
| G06N 20/20 | (2019.01) |
| G10L 15/16 | (2006.01) |

(Continued)

(52) U.S. Cl.
CPC ............ *G06F 40/30* (2020.01); *G06N 5/027* (2013.01); *G06N 20/20* (2019.01); *G10L 15/063* (2013.01); *G10L 15/16* (2013.01); *G10L 15/18* (2013.01); *G06F 40/295* (2020.01); *G10L 15/07* (2013.01); *G10L 15/183* (2013.01);

(Continued)

(58) Field of Classification Search
None
See application file for complete search history.

(56) References Cited

U.S. PATENT DOCUMENTS 7,933,774 B1 *  4/2011  Begeja ................. G10L 15/063
                                               704/231
9,666,182 B2 *  5/2017  Hakkani-Tur .......... G10L 15/07
(Continued)

OTHER PUBLICATIONS

Yin, et al., "ABCNN: Attention-Based Convolutional Neural Network for Modeling Sentence Pairs", Transactions of the Association for Computational Linguistics, vol. 4 (arXiv:1512.05193v4 [cs.CL]), revised Jun. 25, 2018, 14 pages.

(Continued)

*Primary Examiner* — Richard Z Zhu
(74) *Attorney, Agent, or Firm* — Haynes and Boone, LLC

(57) ABSTRACT

A system for determining context and intent in a conversation using machine learning (ML) based artificial intelligence (AI) in omnichannel data communications is disclosed. The system may comprise a data store to store and manage data within a network, a server to facilitate operations using information from the one or more data stores, and a ML-based AI subsystem to communicate with the server and the data store in the network. The ML-based AI subsystem may comprise a data access interface to receive data associated with a conversation with a user via a communication channel. The ML-based AI subsystem may comprise a processor to provide a proactive, adaptive, and intelligent conversation by applying hierarchical multi-intent data labeling framework, training at least one model with training data, and generating and deploying a production-ready model based on the trained and retained at least one model.

20 Claims, 19 Drawing Sheets

(51) Int. Cl.
  *G10L 15/06* (2013.01)
  *G10L 15/183* (2013.01)
  *G10L 15/07* (2013.01)
  *G06F 40/295* (2020.01)
  *G10L 15/22* (2006.01)

(52) U.S. Cl.
  CPC ...... *G10L 15/1815* (2013.01); *G10L 15/1822* (2013.01); *G10L 2015/227* (2013.01)

(56) References Cited

U.S. PATENT DOCUMENTS

| | | | | |
|---|---|---|---|---|
| 9,741,336 | B2* | 8/2017 | Williams | G06F 40/56 |
| 9,870,356 | B2* | 1/2018 | Hakkani-Tur | G06F 40/35 |
| 9,922,642 | B2* | 3/2018 | Pitschel | G10L 15/22 |
| 10,068,174 | B2* | 9/2018 | Aili | G06F 9/445 |
| 10,262,272 | B2* | 4/2019 | Chickering | G06N 20/00 |
| 10,573,304 | B2* | 2/2020 | Gemmeke | G10L 15/06 |
| 10,810,994 | B2* | 10/2020 | Hirzel | G06N 5/045 |
| 2005/0105712 | A1* | 5/2005 | Williams | G10L 13/027 |
| | | | | 704/275 |
| 2006/0190253 | A1* | 8/2006 | Hakkani-Tur | G10L 15/26 |
| | | | | 704/243 |
| 2013/0151598 | A1* | 6/2013 | Fu | H04L 67/42 |
| | | | | 709/203 |
| 2015/0227845 | A1* | 8/2015 | Hakkani-Tur | G06F 40/35 |
| | | | | 706/52 |
| 2016/0162802 | A1* | 6/2016 | Chickering | G06N 20/00 |
| | | | | 706/12 |
| 2019/0042988 | A1* | 2/2019 | Brown | G06N 5/022 |

OTHER PUBLICATIONS

Kim, "Convolutional Neural Networks for Sentence Classification", Proceedings of the 2014 Conference on Empirical Methods in Natural Language Processing (EMNLP) (arXiv:1408.5882v2), revised Sep. 3, 2014, 6 pages.

Kurata, et al., "Improved Neural Network-based Multi-label Classification with Better Initialization Leveraging Label Co-occurrence", Proceedings of the 2016 Conference of the North American Chapter of the Association for Computational Linguistics: Human Language Technologies, Jun. 2016, pp. 521-526.

Lei, et al., "Molding CNNs for text: non-linear, non-consecutive convolutions", Proceedings of the 2015 Conference on Empirical Methods in Natural Language Processing (arXiv: 1508.04112v2), revised Aug. 18, 2015, 11 pages.

* cited by examiner

300D

| clusters | | activation | ngram | wordgram | slot_pattern | proportion of max possible |
|---|---|---|---|---|---|---|
| 0 | 0 | 2.588807 | [35, 178] | [appointment, cancelled] | [0.4188201, -0.0398941] | 1.528986 |
| | 1 | 2.526010 | [35, 243] | [appointment, canceled] | [0.4188201, -0.0398941] | 1.491321 |
| | 2 | 2.480455 | [2, 178] | [, cancelled] | [-0.28858892, -0.0398941] | 1.452619 |
| | 3 | 2.396657 | [2, 243] | [, canceled] | [-0.28858892, -0.0398941] | 1.414953 |
| | 5 | 2.362807 | [91, 178] | [order, cancelled] | [-0.0429508, -0.0398941] | 1.394850 |
| 1 | 4 | 2.394029 | [62, 62] | [cancel, cancel] | [1.0036755, -0.0398941] | 1.413402 |
| | 10 | 2.258328 | [62, 171] | [cancel, thursday] | [1.0036755, -0.0398941] | 1.333288 |
| | 12 | 2.169262 | [62, 521] | [cancel, appointments] | [1.0036755, -0.0398941] | 1.280702 |
| | 18 | 2.120287 | [62, 149] | [cancel, scheduled] | [1.0036755, -0.0398941] | 1.251788 |
| | 22 | 2.089160 | [62, 145] | [cancel, friday] | [1.0036755, -0.0398941] | 1.233412 |
| 2 | 39 | 1.963202 | [176, 1005] | [cancelled, plans] | [1.6793385, -0.0398941] | 1.159048 |

Receive communication channel, the data for training at least one model to determine intent in the conversation with the user
701

Select any unlabeled data from the data associated with the conversation from the user, the selected unlabeled data having probability of impacting the at least one model
702

Provide a hierarchical multi-intent data labeling framework for labeling a representative subset of data from at least one of the data associated with the conversation with the user or the selected unlabeled data
703

Train the at least one model based on the labeled representative subset of data using a plurality of parameter choices
704

Retain at least one candidate model set from the at least one trained models based on global metric performance
705

Generate a production-ready model based on the retained at least one candidate model set
706

Deploy the production-ready model for intent determination in the conversation with the user
707

FIG. 7

DETERMINING CONTEXT AND INTENT IN OMNICHANNEL COMMUNICATIONS USING MACHINE LEARNING BASED ARTIFICIAL INTELLIGENCE (AI) TECHNIQUES

TECHNICAL FIELD

This patent application relates generally to omnichannel communication of data, and more specifically, to systems and methods for determining context and intent in omnichannel communications using machine learning based artificial intelligence (AI) techniques.

BACKGROUND

Centralized scheduling services are useful for coordinating meetings and tasks, as well as scheduling appointments. Recent advances in mobile telecommunications are changing the way people communicate with one another and the way people buy goods and services. In the service industry, for example, a customer journey may involve an organization, like a media company, having numerous interactions with its customers or subscribers. For instance, when a customer is interested in purchasing or troubleshooting a particular issue related to an offered service, the customer may contact the media company to express interest in the service. This initial contact may be a small part what is essentially a prolonged "journey" created by all the moments and interactions leading up to and following that the inquiry, purchase, or troubleshooting event. Ultimately, the media company can offer great products and services, build a stellar website, provide speedy delivery, and even have a dedicated customer service team, but any weak link in this very long chain of customer interactions could send a current or potential customer elsewhere.

Although traditional models have sought to enhance the customer journey in a variety of ways, a technical issue with current online customer conversation systems is that they are static solutions built and established on one-size-fits-all platforms. However, the needs of a media company (or any other provider of goods or services) and its subscribers, for example, are typically different than the needs of an online merchant and its customers. Therefore, traditional customer conversation systems that are good fit in one scenario may not be for another.

Furthermore, some traditional approaches focus on collecting large amounts of data while providing only limited analytics. In other words, current conventional solutions may also generally lack a proactive, adaptive, or intelligent approach to customer interaction, which may often frustrate both customers and organizations alike. Such systems inexorably fail to offer any meaningful way for an organization to "think" more like a customer and leverage insight to more seamlessly map out the various touchpoints of a customer journey to maximize customer experience.

As a result, a more robust approach and holistic solution that better identifies customer touchpoints and more meaningfully incorporates machine learning (ML) based artificial intelligence (AI) techniques to determine context and intent in omnichannel conversations and communications may be imperative to overcome the shortcomings of conventional systems and methods.

BRIEF DESCRIPTION OF DRAWINGS

Features of the present disclosure are illustrated by way of example and not limited in the following Figure(s), in which like numerals indicate like elements, in which:

FIGS. 3A-3E illustrate conversational diagrams and data graphs for determining context and intent in omnichannel communications using machine learning based artificial intelligence (AI), according to an example;

FIG. 7 illustrates a flow chart of a method for determining context and intent in omnichannel communications using machine learning based artificial intelligence (AI), according to an example.

DETAILED DESCRIPTION

Figure 1:
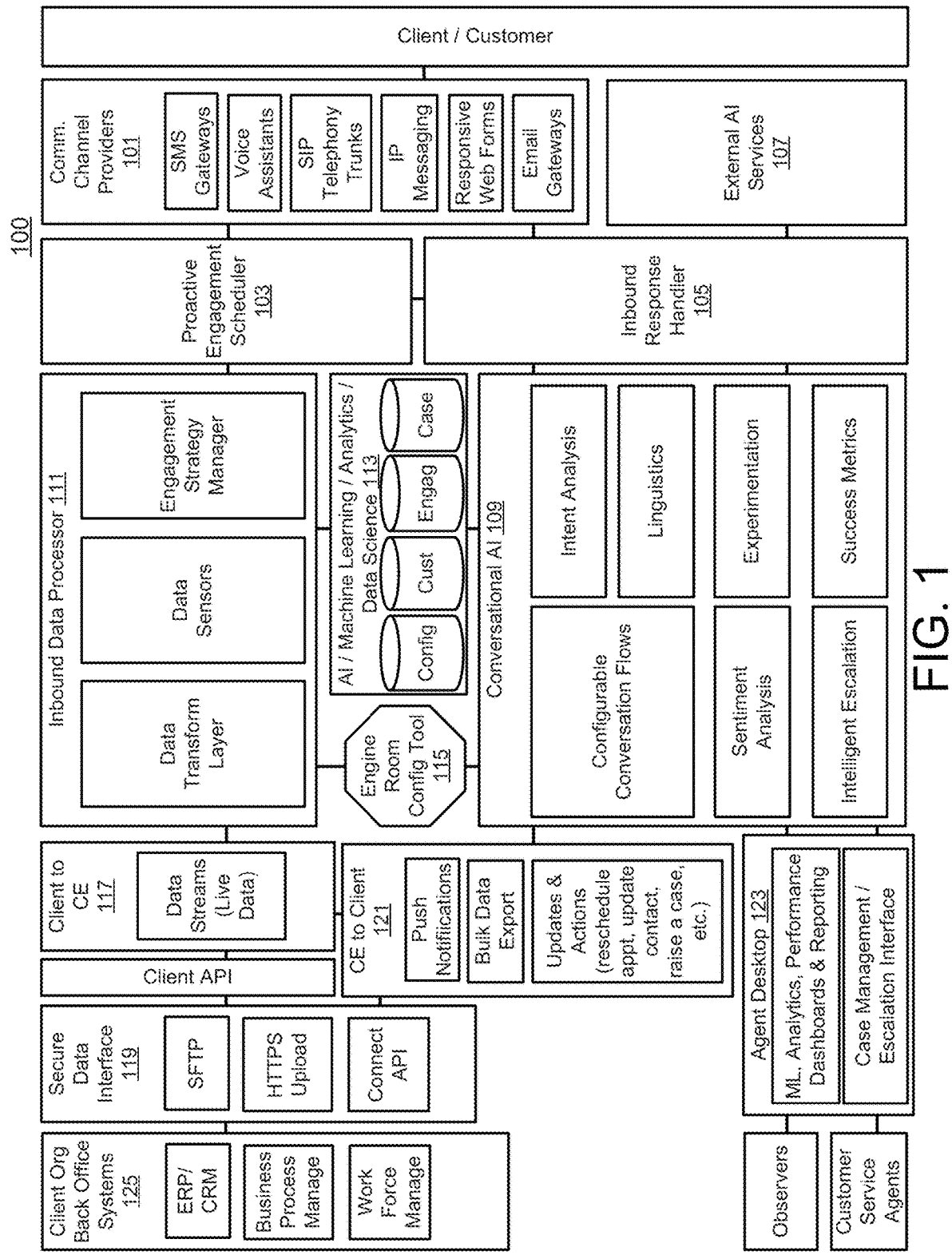
FIG. 1 illustrates a system diagram for determining context and intent in omnichannel communications using machine learning based artificial intelligence (AI), according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

A customer journey may involve numerous interactions a company has with its customers. In order to optimize the customer journey, it may be important for a merchant to recognize and take advantage of all available customer touchpoints and/or channels. As described herein, a touchpoint may refer to any time, place, or way a potential customer or returning customer interacts with a business before, during, or after the customer purchases a good or service. A channel, as described herein, may describe in more detail a medium of interaction between a customer and a business, such as through a mobile application or a customer service representative at a call center.

According to examples described herein, a proactive, adaptive, and intelligent approach may be provided to help organizational entities provide omnichannel communications that provide a more intuitive, natural, and pleasant online experience for customers. As described herein, a machine learning based artificial intelligence (AI) system for determining context and intent in omnichannel conversations and communications may be provided.

In an example, the artificial intelligence (AI) based omnichannel communication system may reduce complexity of customer conversation platforms. By providing a personalized conversation to each individual customer using AI-based techniques to determine context and/or multi-intent, a dynamic omnichannel dialogue or conversation may be established and may allow organizations to provide customers with enhanced customer experience, improved data security, and most notably, a more responsive and centralized way to meet the needs or requests of customers.

More than just providing an immediate or pertinent response to customer inquiries, embodiments described herein may provide a smooth, intuitive, and human-like conversation, coupled with support delivery without having to switch customers to different departments or do a "channel flip." In other words, embodiments described herein may provide a one-stop shop where customer satisfaction is preserved and the conversation experience leads to efficient business fulfilment. Systems and methods described herein may also employ emerging machine learning based AI techniques to recognize conversation context and customer intent(s) in such conversations and thereby improve responsiveness in real-time or near real-time, and doing so for a multitude of simultaneous AI-based conversations for a variety of organizations and customers.

The artificial intelligence (AI) based omnichannel communication system described herein may enable various organizations or brands to proactively engage customers in AI-driven conversations to fulfill business objectives. In its core, the artificial intelligence (AI) based omnichannel communication system may be able to handle multiple streams of live data allowing it to "see" exactly what is happening within critical processes that an organization relies upon for its success. In this way, the artificial intelligence (AI) based omnichannel communication system may be able to look for changes in status or patterns within the data that activate particular business objectives or goals. These data triggers may be identified using a combination of data analysis, artificial intelligence, machine learning techniques, and/or other types of data processing and analysis.

By way of an example, the booking of an appointment to have a service or device repaired may activate an objective to see that appointment completed successfully, or observing a pattern in the data that to facilitate responsiveness and engagement with customer intent and employing AI-based machines to discern conversational context. All of this may improve customer satisfaction and ensure the continuation of the business relationship, customer retention, and product/service delivery.

At the end, the artificial intelligence (AI) based omnichannel communication system described herein may therefore allow an organizational entity (e.g., commercial, financial, government, etc.) to engage with users in more meaningful ways in order optimize customer engagement and product/service delivery. The artificial intelligence (AI) based omnichannel communication system may also provide customized user interfaces to make user interactions more pleasant and meaningful, less error prone, and more dynamically intelligent, all of which may help facilitate user inquiries or request for goods or services by the organizational entity.

FIG. 1 illustrates a diagram of a system 100 for determining context and intent in omnichannel communications using machine learning based artificial intelligence (AI), according to an example. The system 100 may be used to monitor and analyze data. In particular, the system 100 may be used provide a communication or conversation platform between an organizational entity and a user (e.g., customer, member, patient, person, etc.). The organizational entity may be a financial entity, a commercial entity, a government entity, or other entity. The system 100 may also store information or be able to receive information from other sources associated with personal data or information, some of which may be sensitive data or information. For example, the system 100 may use machine learning and predictive analytics to help facilitate communication of data and improve user experience. The system 100 may further include any number of AI-based learning systems (e.g., a clustering system, knowledge graphs, etc.) to provide human-like interactions with users or customers.

The system 100 may operate in a network or an enterprise environment where data is exchanged, and where products or services are being offered to customers. More specifically, the system 100 may provide real-time or near real-time monitoring and analysis of data exchange and data storage, as well as an artificial intelligence (AI) system that uses analytics and predictive modeling to determine context and multi-intent of a user in any given conversation. Although the system 100 is depicted in an integrated manner, it should be appreciated that the system 100 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the system 100 may provide a proactive, adaptive, and intelligent approach to determine context and intent in customer conversations to help organizational entities that ensure enhance efficiency, and provide a more intuitive, natural, and pleasant customer journey experience.

As shown, the system 100 may include communication channel providers 101 that communicate with any number of customers. The communications channel providers 301 may include any number of SMS gateways, voice assistants, SIP telephony trunks, IP messaging, responsive web forms, email gateways, or other conversational entities. In some examples, the communications channel providers 101 may be customer-facing and may be how customers interact with the system 100, e.g., via a digital conversation or communication channel. The communications channel providers 101 may communicate with a proactive engagement scheduler 103 and an inbound response handler 105. The proactive engagement scheduler 103 may facilitate scheduling functionality based on data received at the communications channel providers 101, as well as coordinate functionality with the inbound response handler 105. The inbound response handler 105 may communicate with various external entities, such as external AI services 107 and/or other third party sources. These may include, for example, third-party AI-based services or other business analytics platforms, etc. The inbound response handler 105 may also communicate with other elements in the system 100, such as a conversational AI subsystem 109.

In some examples, the conversational AI subsystem 109, independently or together with other elements of the system 100, may build and train multiple machine learning classifiers as well. These may include convolutional neural networks (CNNs). The machine learning classifiers may perform data processing to detect particular attributes of interested text or conversations. Such attributes may be used for matching to identify visual or textual content for intent or context determination. It should be appreciated that "textual" data, as described herein, may also include visual data, audio data, or video data as well. In other words, "textual data processing" or "data processing," as used herein, may include, without limitation, processing and analysis of multimodal information. For example, this may include processing of textual, audio, video, or other similar data in addition to the actual visual or image data.

CNNs may include many layers that detect, parse, and understand data, e.g., intent or meaning of that data. Furthermore, each layer of the CNN may have a multitude of parameters associated with it. Specific values of those parameters for a successful and accurate data classification may not be known a priori. The conversational AI subsystem 109, independently or together with other elements of the system 100, according to various examples, may provide a method for building and training CNNs to output an accurate classification of data for purposes of creating intuitive artificial conversational entities or other conversational applications for use in the system 100 for determining context and intent in communications with users.

Multiple CNNs may be built and trained by machine learning processing systems, such as the conversational AI subsystem 109. According to an example, a CNN built and trained by the conversational AI subsystem 109 include a CNN. The CNN may identify and determine one or more phrases and match against other similar phrases or characters to determine meaning, context, or intent. Together with other data sources, such as dictionaries, thesaurus, reference materials, etc., a more robust and self-learning system may be provided to better understand user queries and provide natural "human-like" responses.

As discussed in more detail herein, the CNN may be able to identify particular attributes of the data which may be used for human-like conversational platform deployment. This may be particular helpful in understanding meaning of user queries and for other processing and analysis. Furthermore, the CNN may operate in real-time or near real-time to facilitate accurate matching or classification objects from data, or other related functionalities. Accordingly, together with natural language processing (NLP) and/or other processing techniques, the conversational AI subsystem 109 may be used to create and deploy a human-like experience during conversations with users, as well as provide a variety of other functions and services for enhance customer interaction. Details with regard to context and/or multi-intent determination will be apparent with the examples and descriptions provided herein.

In some examples and as shown, the conversational AI subsystem 109 may include various elements, such as configurable conversation flows, intent analysis, sentiment analysis, linguistics, experimentation, intelligent escalation, success metrics, and other elements. These elements may help facilitate human-computer interaction. Other various components and elements may also be provided.

The proactive engagement scheduler 103 may also communicate with an inbound data processor 111, which may include, for example, a data transformation layer, data sensors, and an engagement strategy manager, among other things. These elements may help process data for use in the overall system 100. For example, the data transformation layer may clean, validate, augment data for maximum data quality. The data sensors may look for or identify changes in state or patterns in data. The engagement strategy manager may select the next engagement strategy based on the state change highlighted by the sensors. This may allow a conversation to be dynamic and personalized for each customer or user.

At the core, the system 100 may include an AI engine 113 for machine learning, analytics, data science, etc. Here, data may be used for configuration, customer, engagement, cases, or other AI-based technique. It should be appreciated that an engine room configuration tool 115 may also be provided. The engine room configuration tool 115 may be hardware or software based and may provide high-powered capabilities to speed up efforts to train software to perform various AI-based features, such as translation of textual data to different languages, smart assistant or conversational entities, or tracking written narratives or dialogues.

The inbound data processor 111 may also communicate with a client-to-CE (customer equipment) 116, which may include various data streams received from a client API, which in turn may communicate with secure data interface 119. The secure data interface 319 may include SFTP, HTTPS upload, customer connector API, Salesforce® connector, MS Dynamics 365® connector, or other interface. The inbound data processor 11 may provide security and data protection for communicated data with and within system 100. Other various security features and elements may also be provided.

A CE-to-client 121 may communicate with the conversational AI subsystem 109 and may include push notifications, bulk data export, and updates and actions, which may be used for rescheduling, appointments, update contact details, etc. The conversation AI subsystem 109 may also communicate with an agent desktop 123 that interacts with observers and customer service agents. As shown, the agent desktop 123 may include MI, analytics, performance dashboards, and reporting, etc. It may also include case management, an escalation interface, or other user-friendly interface. In some examples, the agent desktop 123 may enable communications with observers, customer service agents, or other users or personnel.

The secure data interface 119 may also communicate with a client organization back office system 125. The client organization back office system 125 may be where the CRM (or ERP) is housed, along with business process management, work force management, or other enterprise components.

In some examples, the ERP may include one or more application servers that host various ERP applications. These may include, for example, a customer relationship management (CRM) platform, system, or application. The ERP may collect, store, manage, and interpret data associated with various enterprise functions or activities. The ERP may provide an integrated and continuously updated view of core business processes using common databases maintained by a database management system. The ERP may track enterprise resources (e.g., cash, raw materials, production capacity, etc.) as well as other information, such as corporate or business transactions (e.g., orders, purchase orders, payroll, ticketing, etc.). Furthermore, the applications that make up the ERP may share data across various departments (e.g., manufacturing, purchasing, sales, accounting, etc.) that provide the data. The ERP may facilitate information flow between many enterprise functions and may manage communications with stakeholders or other outside parties. As a result, the ERP may contain large quantities of information and data associated with a company, its employees, and various resources.

Although not shown, the system 100 may receive from, transmit to, and/or utilize information from various internal or external data sources to help determine context and intent of users in any given conversation. Some of these data sources may include documents, web feeds, machine and sensor data (hereinafter "sensor data"), and geolocation data, all of which may be distinct or integrated with the system 100. For instance, data received at the documents may include files, emails, faxes, scans, or other documents that are transmitted, received, and stored in an enterprise environment.

Data received at the web feeds may include data from various web sources, such as websites, social media, syndication, aggregators, or from scraping. Websites may include uniform resource locator (URL) or other website identifier. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human-like browsing to enable gathering web page content for offline parsing.

The geolocation data may include information or data associated with identification or estimation of real-world geographic location of an object, such as a radar source, mobile device, or web-based computer or processing device. Geolocation data may provide specific geographic coordinates or data that may be used for monitoring location, distinct or together with, other various positioning systems or applications. For example, the geolocation data may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data may include other self-disclosing or self-identifying information, including but not limited to country, region county, city, postal/zip code, latitude, longitude, time zone, domain name, connection speed, internet service provider (ISP), language, proxies, or other information that can be used to piece together and trace location. This and other data may be collected, monitored, analyzed, and/or incorporated with system 100 for determining context and/or intent in omnichannel communications.

Although not shown, the system 100 may also include any number of data stores. Each or some of the data stores may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource. In some examples, each of the data stores may store information and data associated with operational reporting, controls, and decision-making. For example, each or some of the data stores may be designed to integrate data from multiple sources for additional operations on that data, for example, in reporting, controls, and operational decision support. Integration of data at each or some of the data stores may involve cleaning, resolving redundancy, checking against business rules, and other data integration techniques, such as data virtualization, federation, and extract, transform, and load (ETL). Each or some of these data stores may be used for tactical and strategic decision support.

In some examples, each or some of the data stores may be one or more repositories of integrated data and used to store current and historical data and to create analytical report(s) for advanced enterprise knowledge. Data passed through the each of some of these data stores may also involve cleansing to ensure data quality and usage. ETL may also be used, as well as other techniques, involving staging, data integration, and access features. Data in these data stores may be transformed and catalogued so that it may be used for data mining, analytics, and other business intelligence purposes, such as marketing, decision support, etc.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The system 100 may also include a variety of servers to facilitate, coordinate, and manage information and data. For example, these servers may include any number or combination of the following servers: exchange servers, content management server, application servers, database servers, directory servers, web servers, security servers, enterprise servers, and analytics servers. Other servers to provide data security and protection may also be provided.

There may be many examples of hardware that may be used for or with any of the servers, layers, platforms, subsystems, and components of the system 100 described herein. For example, the hardware may include an integrated circuit, and may execute software or firmware or comprise custom processing circuits, such as an application-specific integrated circuit (ASIC) or field-programmable gate array (FPGA). There may also be any number of I/O interfaces configured as any number of hardware, network, and/or software interfaces that serve to facilitate communication and exchange of data between any number of or combination of equipment, protocol layers, or applications.

As discussed, the system 100 may include any number or combination of systems and applications that interface with users or user-interfacing tools in an enterprise or a personal environment. For example, these may include internal and/or external (e.g., third-party) statistical analysis applications, reporting applications, web and mobile applications, and enterprise applications. The statistical analysis applications may include systems or applications that specialize in statistical calculations or econometrics. These may include, but not limited to, those by Tableau®, Domo®, Salesforce®, JMP®, MATLAB®, QlikSense®, SPSS®, SAS®, State®, Alteryx®, Analytica, etc. The reporting applications may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc. The web and mobile applications may include Internet-based or mobile device based systems or applications of various users, namely those in an enterprise environment. The enterprise applications may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application.

It should be appreciated that a layer, as described herein, may include a platform and at least one application. An application may include software comprised of machine-readable instructions stored on a non-transitory computer readable medium and executable by a processor. The systems, subsystems, and layers shown in FIG. 1 or other figure may include one or more servers or computing devices. A platform may be an environment in which an application is designed to run on. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the servers, and/or other computing elements within the systems, layers, and subsystems of the system 100, as described herein. However, it should be appreciated that multiple servers may be used for each of these servers, and the servers may be connected via one or more networks. Also, middleware (not shown) may be included in the system 100 as well. The middleware may include, for example, software hosted by one or more servers, or it may include a gateway or other related element. Such middleware may be used to enhance data processing, edge-based analytics, or other related operations. Furthermore, it should be appreciated that some of the middleware or servers may or may not be needed to achieve functionality. Other types of servers, middleware, systems, platforms, and applications not shown may also be provided at the back-end to facilitate the features and functionalities of the system 100.

The system 100, as described herein, may provide several benefits and advantages over conventional techniques. For example, the system 100 may balance user experience with an analytics-based conversation platform. Accordingly, more human-like and natural conversations may be provided to customers via his or her desired communication channel, regardless of simultaneous conversation volumes. All the while, the system 100 may know and utilize AI-based techniques to "understand" any conversation or context, to "learn" from it to better respond to customer intent, and to provide meaningful "human-like" responses which ultimately allow the system 100 to engage appropriately. This not only enhances user experience, but minimizes misunderstanding, increases productivity, and reduces response time for customer support demands.

The system 100 may also be friction driven. In other words, friction may be defined by a level of effort applied to a user or applicant during a conversation or communication process. As stated above, customer behavior is complex and gathering information may not be the same for one customer as it is for another customer. As the system 100 discovers areas of friction, it may formulate ways to reduce such friction for similarly situated users or customers. Information such as location, subject matter of conversation, method of interaction, words or phrases used, etc. may be collected and analyzed to provide a better user experience and more efficient service delivery. The system 100 may leverage power of machine learning based AI, analytical business intelligence, and other features to provide users with infinite variations of friction to support or enhance any type of communication or conversation.

The system 100 may also be platform independent. In other words, conversations or dialogues associated with the system 100 may be used across various platforms, such as Windows, MAC, Unix, Linux, or other operating systems. The system 100 may also be hosted in the cloud, provisioned/accessed via the web, or provided locally/remotely via on-site premises, or via a variety of mobile device applications or systems.

Within the system 100, there may be a large amount of data that is exchanged, and the exchanged data may sensitive or personal. It should be appreciated that any use of such information may readily comply with one or more privacy laws and regulations, such as the General Data Protection Regulation (GDPR) or other effective policies.

Ultimately, the system 100 may provide a proactive, adaptive, and intelligent approach to help organizational entities that ensure data security, enhance efficiency, and provide a more intuitive, natural, efficient, and pleasant online experience for customers. The system 100 may provide a more robust and holistic approach for artificial intelligence (AI) based omnichannel communications using machine learning to determine context and/or intent in conversations with various users.

Figure 2:
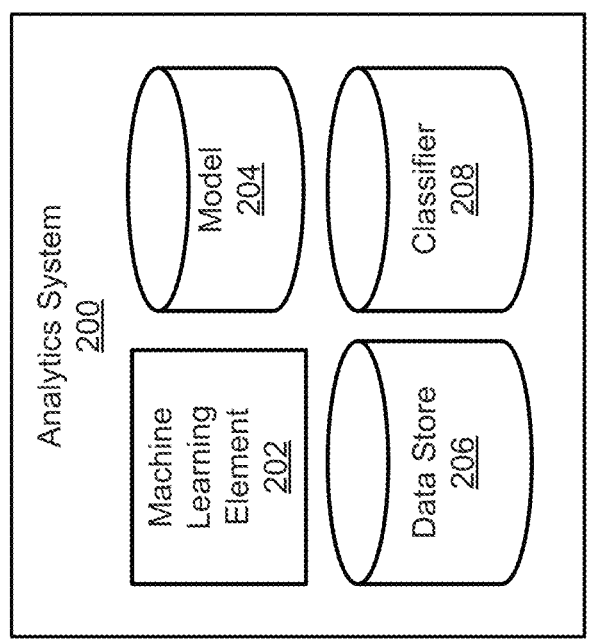
FIG. 2 illustrates a block diagram of a machine learning based artificial intelligence (AI) subsystem, according to an example.
Figure 3A:
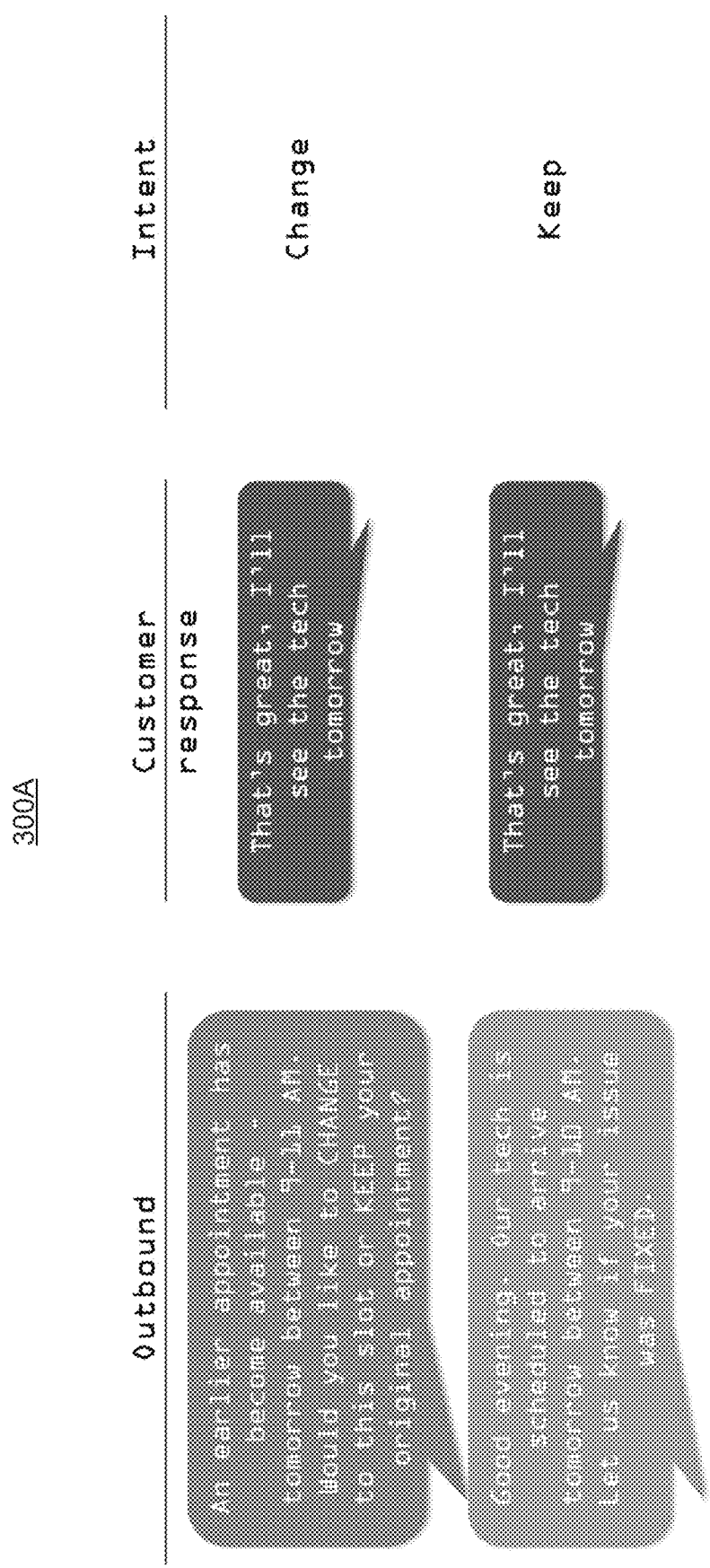
Figure 3B:
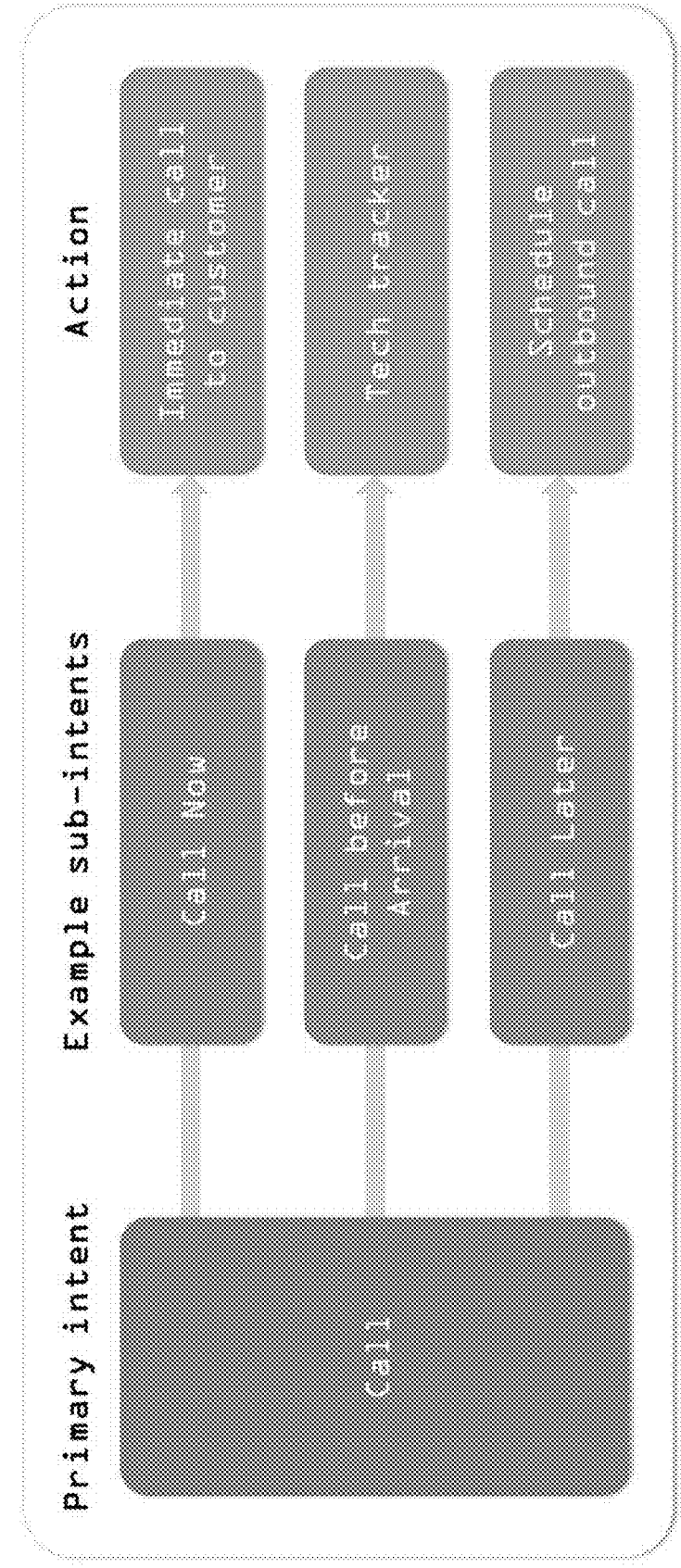
Figure 3C:
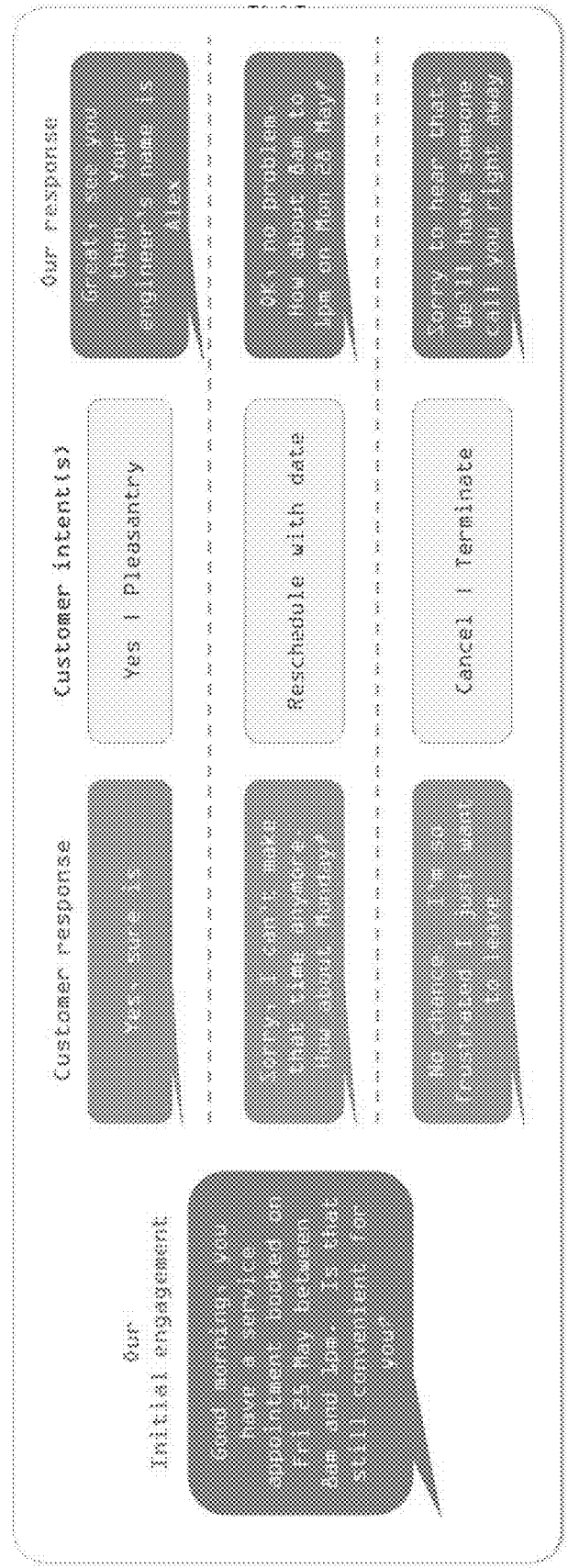
Figure 3E:
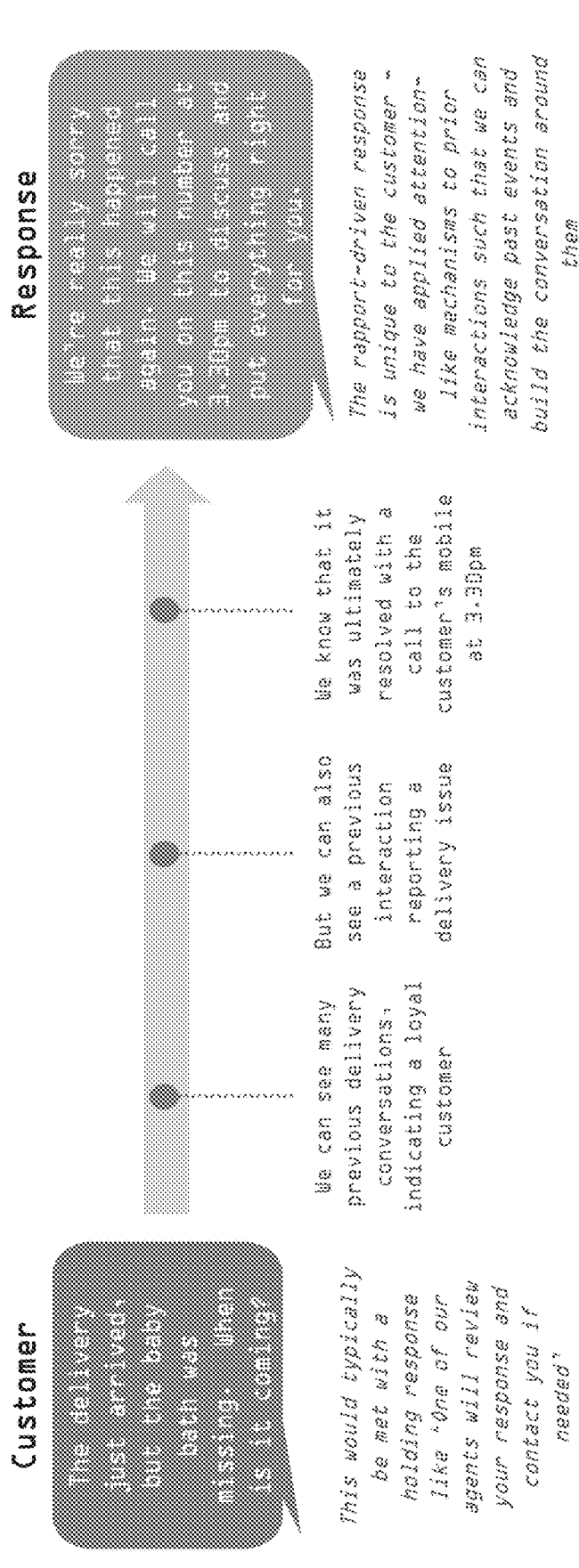

FIG. 2 illustrates an example of components in the machine learning based artificial intelligence (AI) subsystem 200, according to an example. Although the machine learning based artificial intelligence (AI) subsystem 200 shown in FIG. 2 is depicted in an integrated manner, it should be appreciated that the machine learning based artificial intelligence (AI) subsystem 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the machine learning based artificial intelligence (AI) subsystem 200 may a proactive, adaptive, and intelligent approach to communication and customer conversations to help organizational entities that ensure data security, enhance efficiency, and provide a more intuitive, natural, and pleasant online experience. In an example, the machine learning based artificial intelligence (AI) subsystem 200 may be a machine learning system that is an integrated part of the conversational AI subsystem 109, the AI engine 113, and/or the engine room configuration tool 115, as shown in FIG. 1.

In the example of FIG. 2, the machine learning based artificial intelligence (AI) subsystem 200 may employ one or more techniques to help define, modify, track, schedule, execute, compare, analyze, and/or evaluate various data or deploy one or more applications to determine context and/or intent in conversations with various users. In some examples, the machine learning based artificial intelligence (AI) subsystem 200 may include a machine learning element 202, a model 204, a data store 206, and a classifier 208.

In particular, the machine learning element 202 may train the model 204 based on training data included in the data store 206. The machine learning element 202 may also train the classifier 208 based on the training data. The classifier 208 may be used to define, modify, track, schedule, execute, compare, analyze, and/or evaluate various data associated with determining context and/or intent in conversations with various users. Based on these assessments, the machine learning element 202 may help the machine learning based artificial intelligence (AI) subsystem 200 generate potential responses that are meaningful to the conversation based on the assessed context and intent of the user.

The machine learning based artificial intelligence (AI) subsystem 200 may use the machine learning element 202 to generate the model 204 and the classifier 208. The model 204 generated may provide a framework for assessing, evaluating, and identifying context and/or intent in any conversation. In some examples, the model 204 may include a set of weights associated with a set of features for generating an output score or value as a weighted aggregation of scores or values associated with various features. In other examples, the model 204 may include a set of weights along with instructions for aggregating weights for generation of an output score or value. In some examples, a vector or array generator (not shown) may use the model 204 to generate a vector or array that represents the characteristics of context or intent, especially in conversational analysis or other similar digital content processing. The machine learning element 202 may also generate a classifier 208 that takes input from the model 204, such as the vector or array generated using the model 204, to return an identification of whether the content represented by the vector may help determine context and/or intent. In order to generate the vector or array, the training data may be provided as a matrix format. The classifier 208 generated by the machine learning element 5450 may be a single classifier or multiple classifiers, each of which may determine performance capability for each of the servers 140. These scores or values may help the machine learning element 202 analyze, determine, rank, sort, arrange, and/or categorize potential intent or context of a conversation.

The machine learning element 202 may ingest the training data from the data store 206 to generate the model 204 and any classifier 208. The data store 206 may include any previously analyzed content and data describing the content. In some examples, the training data may not provide data specific to a digital content or conversation, and instead may merely indicate whether or not that digital content or conversation may be more likely to succeed or fail at eliciting user interaction. The data store 206 may include data obtained from any other data source.

The machine learning element 202 may generate the model 204 based on optimization of different types of content or linguistic analysis models, including but not limited to, linguistic, semantic, or other types of data processing analysis algorithms for determining intent or context. For example, the generated model 204 may include a neural network (e.g., a convolutional neural network (CNN)), a tree-based model, a Bayesian network, a support vector, clustering, a kernel method, a spline, a knowledge graph, or an ensemble of one or more of these and other techniques. The machine learning element 202 may determine the weights of the model 204, e.g., the weights of edges of a neural network corresponding to the model 204. The machine learning element 202 may further generate a classifier 208 that may use such techniques. The machine learning element 202 may periodically update the model 204 and/or classifier 208 based on additional training or updated data associated with the system 300.

It should be appreciated that the machine learning element 202 may vary depending on the type of input and output requirements and/or the type of task or problem intended to be solved. The machine learning element 202, as described herein, may use supervised learning, semi-supervised, or unsupervised learning to build the model 204 using data in the data store 206. Supervised learning may include classification and/or regression, and semi-supervised learning may include iterative optimization using objection functions to fill in gaps when at least some of the outputs are missing. It should also be appreciated that the system 300 may provide other types of machine learning approaches, such as reinforcement learning, feature learning, anomaly detection, etc.

It should be appreciated that classification algorithms may provide assignment of instances to pre-defined classes to decide whether there are matches or correlations. Alternatively, clustering schemes or techniques may use groupings of related data points without labels. Use of knowledge graphs may provide an organized graph that ties nodes and edges, where a node may be related to semantic concepts, such as persons, objects, entities, events, etc., and an edge may be defined by relations between nodes based on semantics. It should be appreciated that, as described herein, the term "node" may be used interchangeably with "entity," and "edge" with "relation." Also, techniques that involve simulation models and/or decision trees may provide a detailed and flexible approach to determining intent and/or context in a conversation, as described herein.

It should be appreciated that the systems and subsystems shown herein, as described herein, may include one or more servers or computing devices. Each of these servers or computing devices may further include a platform and at least one application. An application may include software (e.g., machine-readable instructions) stored on a non-transitory computer readable medium and executable by a processor. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some behaviors, such as exception handling, memory management, etc., of the platform at runtime. A subsystem may be similar to a platform and may include software and hardware to run various software or applications.

While the servers, systems, subsystems, and/or other computing devices may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the machine learning based artificial intelligence (AI) subsystem 200.

By providing machine learning capabilities, the machine learning based artificial intelligence (AI) subsystem 200 may enable the user to analyze the details and nuances of many (e.g., dozens of) solutions at the same time, rather than individually analyzing one solution at a time to see if each solution is appropriate. This may be particularly helpful in conversation analysis. The machine learning based artificial intelligence (AI) subsystem 200 may therefore enable a user to explore a large number (e.g., millions) of solutions efficiently in less time than it would take a typical practitioner to evaluate fewer (e.g., a couple dozen) solutions.

It should be appreciated that data exchanged in a conversation with a customer may involve processing data. In some examples, data may be multimodal, as described herein. Audio or visually-oriented data (e.g., a digital image video), for example, may require additional processing. For instance, this may also include processing metadata associated with that digital image. As needed, pattern recognition may be applied during image processing to detect a particular object or pattern in the image. Different types of conventional machine learning functions may be used for pattern recognition or audio-based processing.

CNNs may include many layers to detect, parse, and understand data, e.g., intent or meaning of data. Furthermore, each layer of the CNN may have a multitude of parameters associated with it. Specific values of those parameters for a successful and accurate data classification may not be known a priori. The machine learning based artificial intelligence (AI) subsystem 200, according to various examples, may provide a method for building and training CNNs to output an accurate classification of data for purposes of creating intuitive artificial conversational entities or other conversational applications for use in the system 100.

Multiple CNNs may be built and trained by a machine learning processing system. According to an example, a CNN built and trained by a machine learning processing system may include a CNN. The CNN may identify and determine one or more phrases and match against other similar phrases or characters to determine meaning, context, or intent. Together with other data sources, such as dictionaries, thesaurus, reference materials, etc., a more robust and self-learning system may be provided to better understand user queries and provide natural AI-based responses.

As discussed in more detail herein, the CNN may be able to identify particular attributes of the data which may be used for human-like conversational platform deployment. This may be particular helpful in understanding meaning of user queries and other processing and analysis. Furthermore, the CNN may operate in real-time or near real-time to facilitate accurate matching or classification objects from data. Together with natural language processing (NLP) and/or other processing techniques, a machine learning processing system may be used to create and deploy a human-like experience during conversations with users, as well as provide a variety of other functions and services for enhance customer interaction. In another example, the machine learning based artificial intelligence (AI) subsystem 200 may also include an external system, such as content delivery system (not shown), that may be controlled based on a selected solution. For example, instructions may be sent to the content delivery system based on attributes determined.

It should be appreciated that while supervised learning is primarily described, including but not limited to, classification using labelled training data, etc., other various techniques may also be provided. These may include modeling, clustering, simulation, predictive analytics, use of knowledge graphs, as well as various other statistical or data-driven approaches. Any technique that may facilitate decision-making, conversational response generation, scheduling, customer routing, pattern recognition, natural language processing (NLP), and/or machine learning may also be provided in the artificial intelligence (AI) based omnichannel communications system 100 and/or machine learning based artificial intelligence (AI) subsystem 200.

Ultimately, the machine learning based artificial intelligence (AI) subsystem 200 may monitor and analyze data to determine context or intent in a conversation, all the while streamlining conversations with users for goods and services.

FIGS. 3A-3E illustrate conversational diagrams and data graphs 300A-300E for determining context and intent in omnichannel communications using machine learning based artificial intelligence (AI), according to an example. The intent of a customer response, for example, may depend on contextual information, such as its position within a dialogue, a customer's appointment time (in a service dialogue), or other contextual situation. In a situation, as shown in conversational diagram 300A of FIG. 3A, where the customer does not reply as he or she is encouraged to, like using specific key words, such as "CHANGE," "KEEP," or "FIXED," as shown in the outbound messages, it may be difficult to determine exactly what the customer's intent may be. There may be two different outbound questions and the customer response may be the same, but as shown, the intent may be completely different. The same response may indicate either an intent to "change" the scheduled appointment to a new one or to "keep" the originally scheduled appointment.

To maximise the efficacy of intent classification, the systems and methods described herein may incorporate context by jointly encoding a customer response with dialogue history, incorporating the attention mechanism into its convolutional layers, or other techniques.

It should be appreciated that a customer may also not stick to one intent per response. In other words, a customer may intend more than one thing in any particular response. Accordingly, the machine learning based artificial intelligence (AI) subsystem 200, for example, may be configured to capture a plurality of customer intentions. As shown in conversational diagram 300B of FIG. 3B, there may be a hierarchy of intents, including primary intent and one or more layers of sub-intents for each primary intent. Furthermore, many intents, which may be linguistically similar, may be correlated to one or more actions, since each of these intents or sub-intents may need to be handled differently on different occasions.

In some examples, this may be achieved by incorporating multi-intent relations. For instance, the machine learning based artificial intelligence (AI) subsystem 200 may perform intent design, labelling workflow, and model architecture in concert. The machine learning based artificial intelligence (AI) subsystem 200 may also split mutually exclusive intents, for example, keep and reschedule, into parallel workflows. The analytics 200 may also incorporate hierarchical relations, as shown in 300B. By incorporating structural information derived from the above into our model architectures, the machine learning based artificial intelligence (AI) subsystem 200 may develop fine-grained, multi-label intent recognition.

That customers reply in a non-standard way may be indicative of their expectations of the capability of Human-Computer Interaction (HCI). With HCI becoming ever more sophisticated and prevalent, such expectations may only increase, as will the number of customers with those expectations. Accordingly, the machine learning based artificial intelligence (AI) subsystem 200 may provide intent analysis meet those expectations by engaging in more natural conversation, as shown in the conversational diagram 300C of FIG. 3C. Here, an intent-enabled complex conversation may be provided.

The systems and methods described herein may perform distributed training to maximize results obtainable from one or more models. In some examples, hyper-parameter searches and/or multiple runs with different seeds may improve model performance and the ability to assess models. In some examples, visualizations of model runs may help guide model development and understanding as well. These illustrations may help provide a deeper (visual) understanding of learning rate, dropout, n-grams, numerical filters, and/or other intent or context analysis.

As described herein, deep neural network architectures may be used to help provide explanations for convolutional architectures. For example, such techniques may help analyze which part of text may contribute most to prediction by looking at n-grams (word patterns) which triggered the most activated filters, as shown in data graph 300D of FIG. 3D. In some examples, cluster analysis on n-gram activation patterns may show different linguistic patterns that each filter can detect. It should be appreciated that identifying n-grams, which activate the convolutional neural networks (CNNs) may allow for interpretable predictions. Hidden neurons, for instance, may have a local receptive field. In other words, they may incorporate information from a segment of the input text. A pooling operation may then involve each convolutional filter being identified with a portion of the text. At prediction time, for example, a probing classifier may be applied to the model's hidden activations that identify which convolutional filters (and hence which text portions) have the greatest effect on the model prediction. For model level interpretability, an entire dataset though may be run through this process and clustering algorithms may be applied to the activations. This may help identify linguistic patterns corresponding to both filters and/or intents that explain the model's predictive capabilities.

Although most customer interactions are not designed to build a close and harmonious relationship (e.g., in which the company understands the customer's feelings or ideas in order to communicate well and build a rapport), most relationships instead tend to be focused on completing the immediate transaction in hand. Employing and leveraging Human-Computer Rapport (HCR) technology may help alleviate these issues and allow the systems and methods described herein to establish a more "customer-sympathetic" relationship. As shown in conversational diagram 300E of FIG. 3E, a more rapport-driven response may be provided in response to a customer. In some examples, auxiliary sentiment and language analysis natural language processing (NLP) models may be run on an entire conversation (e.g., including context). Furthermore, responses may be generated such that they can adapt the type of language to any given customer and what the sentiment of the current communication may be. For instances, the response may try to appease a dissatisfied customers or reassure a worried customer.

Figure 4:
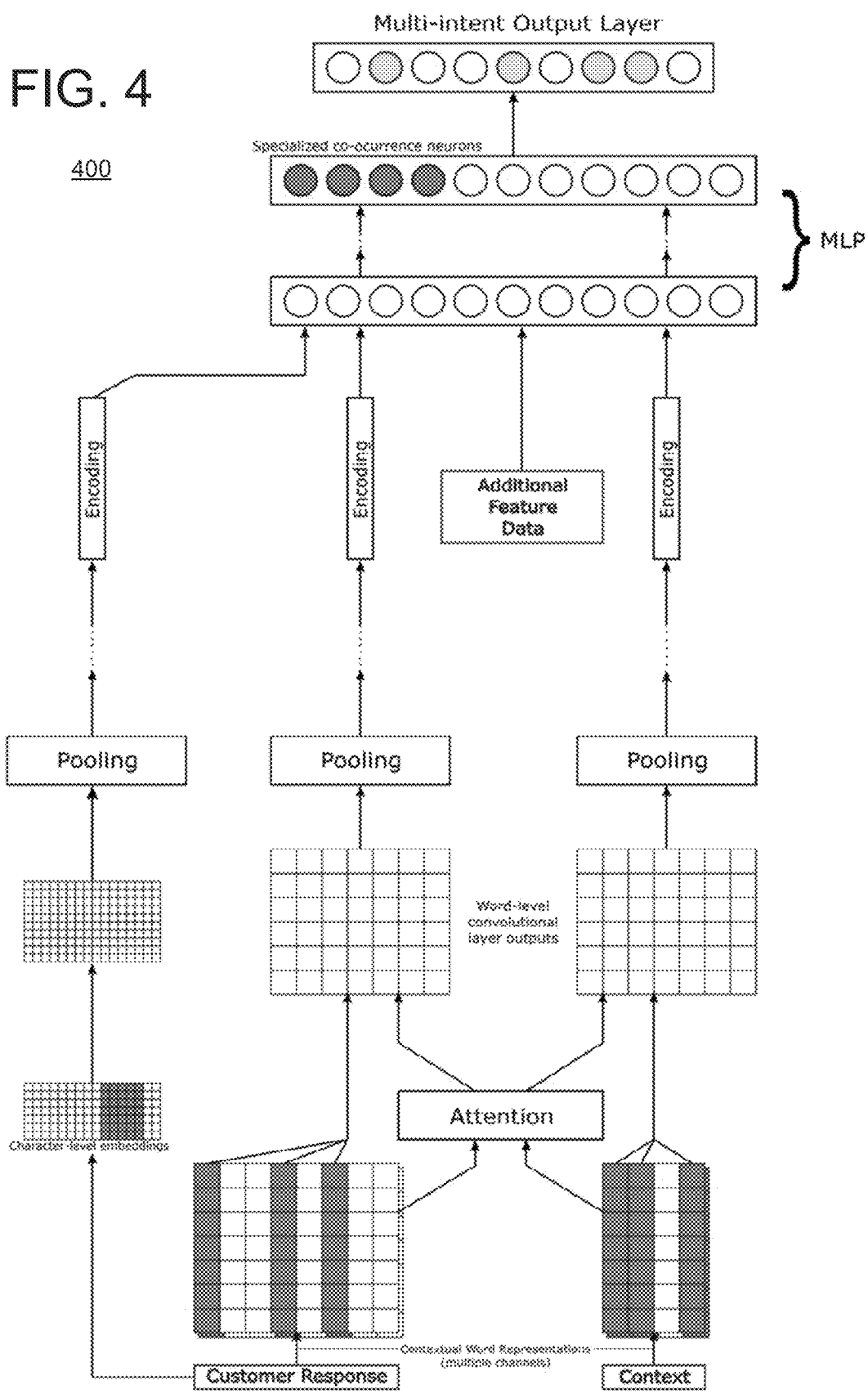
FIG. 4 illustrates a multi-intent data flow diagram for determining context and intent in omnichannel communications using machine learning based artificial intelligence (AI), according to an example.

FIG. 4 illustrates a multi-intent data flow diagram 400 for determining context and intent in omnichannel communications using machine learning based artificial intelligence (AI), according to an example. One of the primary features of the systems and methods described herein may be intent classification capabilities, which may be based on a deep neural network architecture, as described above. There may be several notable components associated with the architecture, as shown in the diagram 400. For example, customer message data may be embedded into the model using pre-trained word embeddings, both fixed and variable (trainable) embeddings. It should be appreciated that there may also be support for language model pre-training for contextualized word vectors, as needed. For example, contextualized word representations from fine-tuned large transformer models, among other things, may be used. In some examples, such techniques may be used in addition or alternatively to word vectors in order to improve performance of the model using client-specific data. The architecture may also include custom convolutional layers of varying widths act on both word embedding data and at the character level, interspersed with different types of pooling layers. In contrast to traditional convolutions, the word-level convolutions in the systems and methods described herein may make use of non-linear operations in order to identify higher order dependencies within the messages.

The convolutions provided may also act on non-consecutive n-grams in order to capture longer-term dependencies than traditional convolutions, with a penalty factor for longer-distance n-grams in order to bias them towards close words. In this way, context of the message to be identified may be fed in as the set of previous messages in the conversation as well as additional features (timestamps, conversation channel, etc.). Prior messages may be jointly encoded using a similar convolutional structure and an attention mechanism may be used to identify parts of the context that are relevant to the intent of the customer message.

The encodings, along with other additional features, may then be passed on to a multilayer perceptron (MLP), ending with an output layer that is able to predict multiple occurring intent labels within one message. In some examples, the final MLP layer may be initialized in a specific way so as to encode multiple label co-occurrence and specialize certain neurons to identify it.

For purposes of training and fine-tuning, it should be appreciated that training/test data may be obtained via a custom data labelling workflow with hierarchical multi-intent labelling and/or the ability to read the context of the message to be labelled, which may be designed to maximize labelling accuracy and limit cognitive overload of labelers.

Prior to data labelling, it should be noted that auxiliary models may be used to identify the raw (unlabeled) data that is likely to have a higher impact on current model performance. This may include both overall performance as well as for individual intents that are found to be underperforming. In this way, training data may be fed in with the ability to automatically oversample parts of the data in order to improve the performance of certain key intents or types of utterances.

Successive models may be trained in a layered fashion. In some examples, this may start with a trained model for a smaller set of key intents, and then layers may be added to deal with secondary intents and the weights of the initial layers frozen during training so as to maintain performance of the key intents in subsequent models. This may allow introduction of new intents with relatively little additional training data.

An ensemble of such models may be finally obtained by using different hyper-parameters, training methods, and training data subsets/samples, which may result in an overall ensemble model that maximizes performance relative to any of its components.

It should be appreciated that the systems and methods described herein may include an ability to extract information from the convolution layers and determine their roles within the network, for example, by identifying the n-grams that most activate particular filters and also through data perturbation and the introduction of counterfactuals. The systems and methods may also include an ability to generate custom visualizations based on the weights within the network, e.g., in order to pinpoint the effects of different types of training methods on the individual layers.

Figure 5:
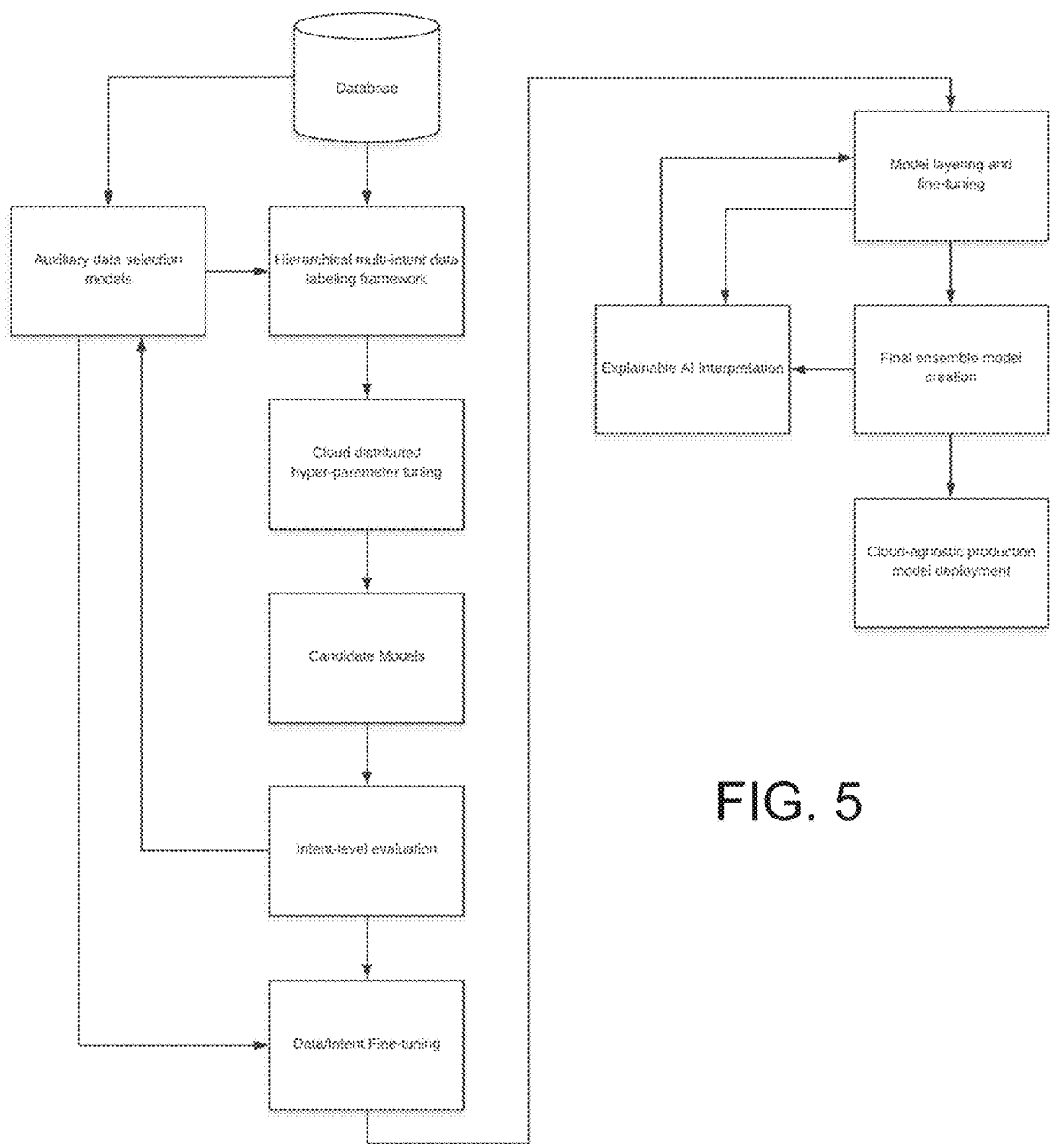
FIG. 5 illustrates a data flow diagram for determining context and intent in omnichannel communications using machine learning based artificial intelligence (AI), according to an example.
Figure 6A:
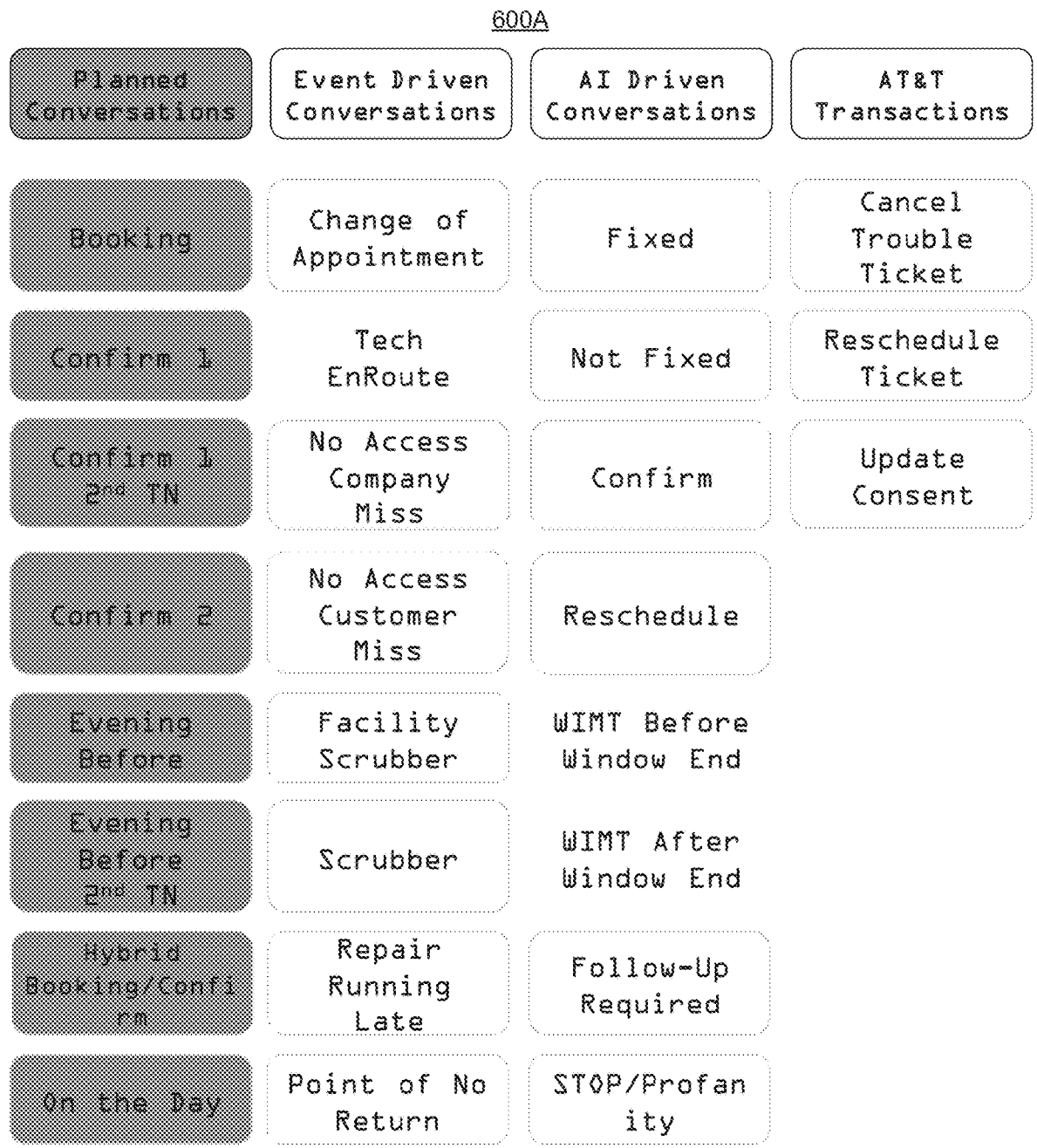
FIGS. 6A-6I illustrate screens for determining context and intent in omnichannel communications using machine learning based artificial intelligence (AI), according to an example.
Figure 6B:
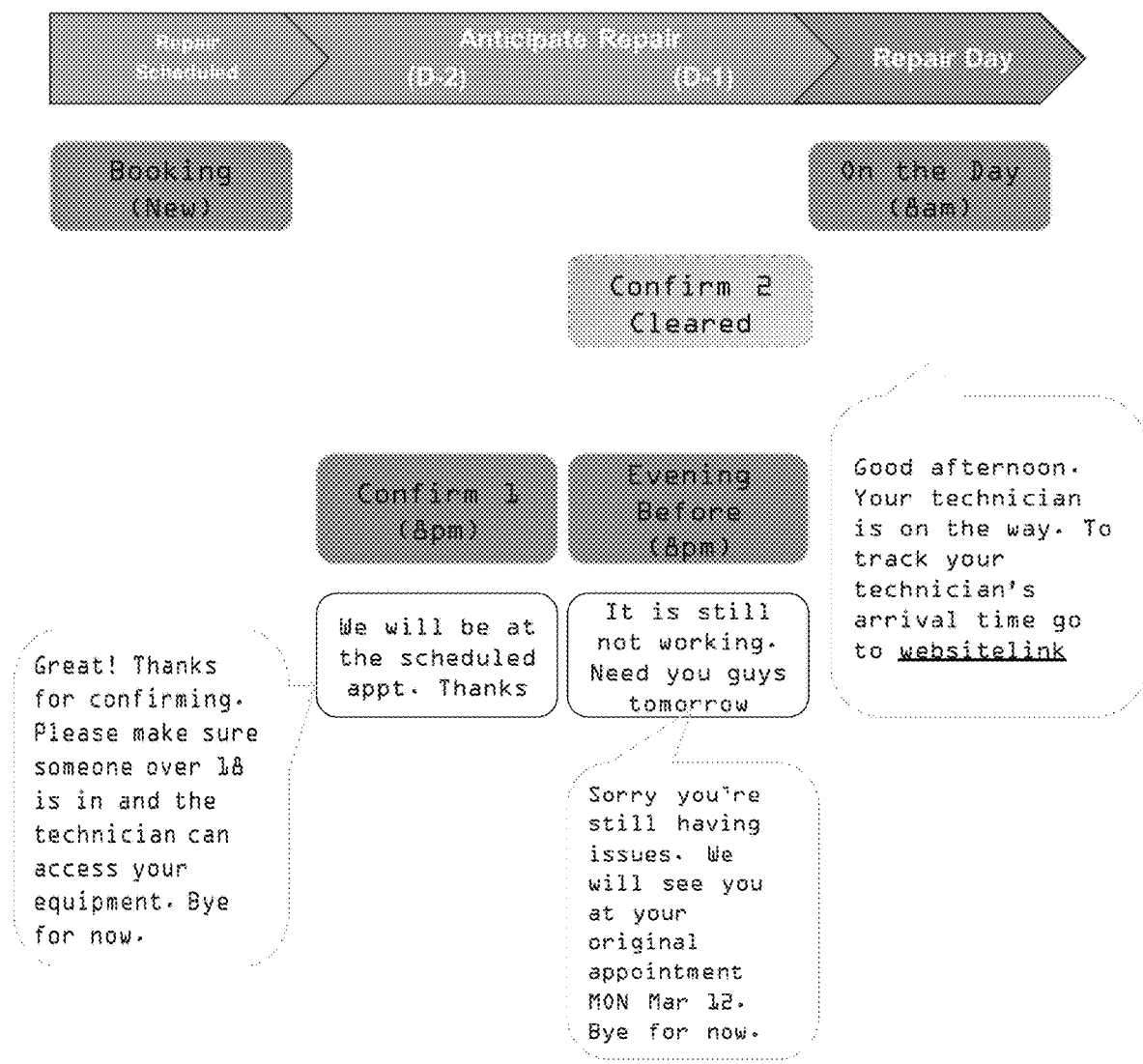
Figure 6C:
Figure 6D:
Figure 6E:
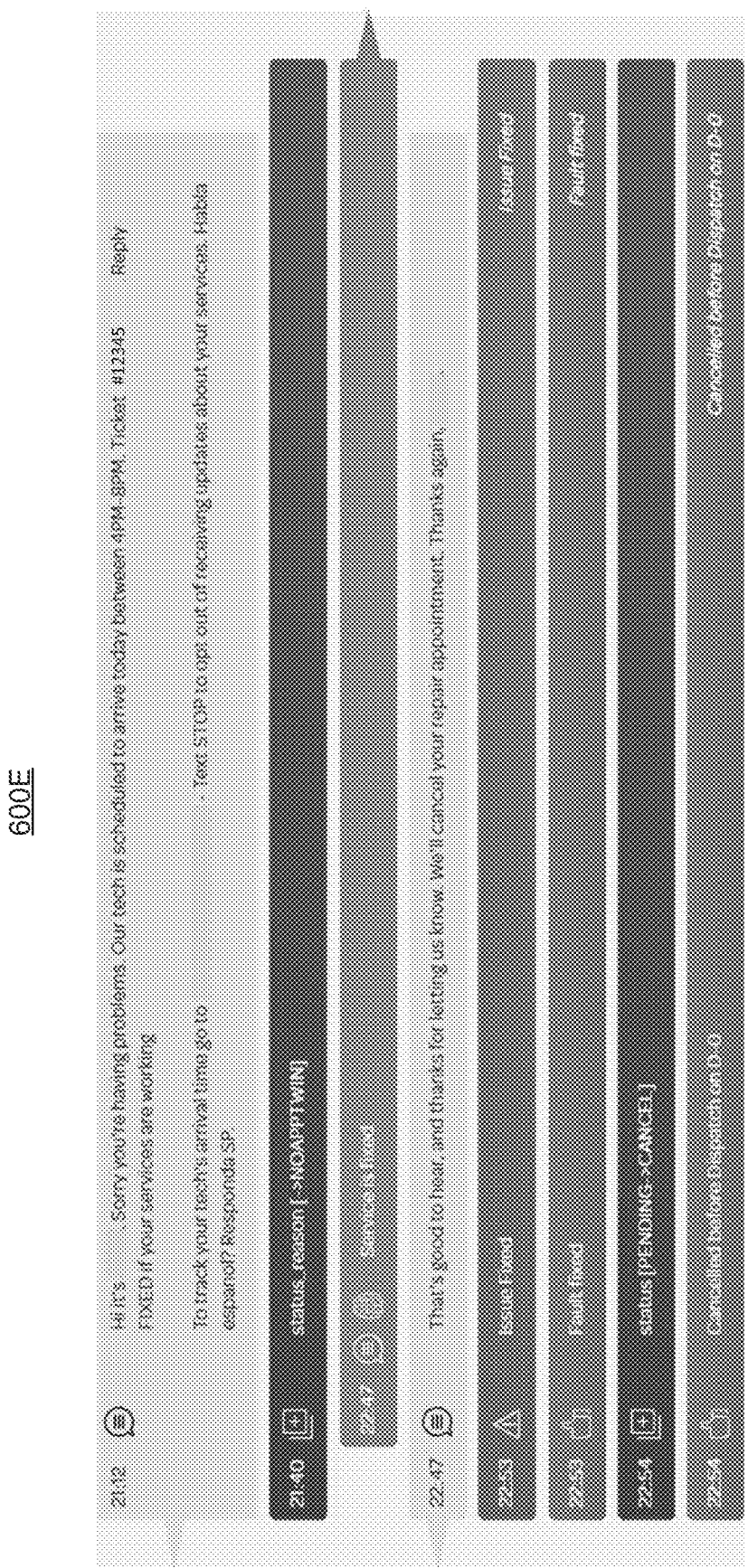
Figure 6F:
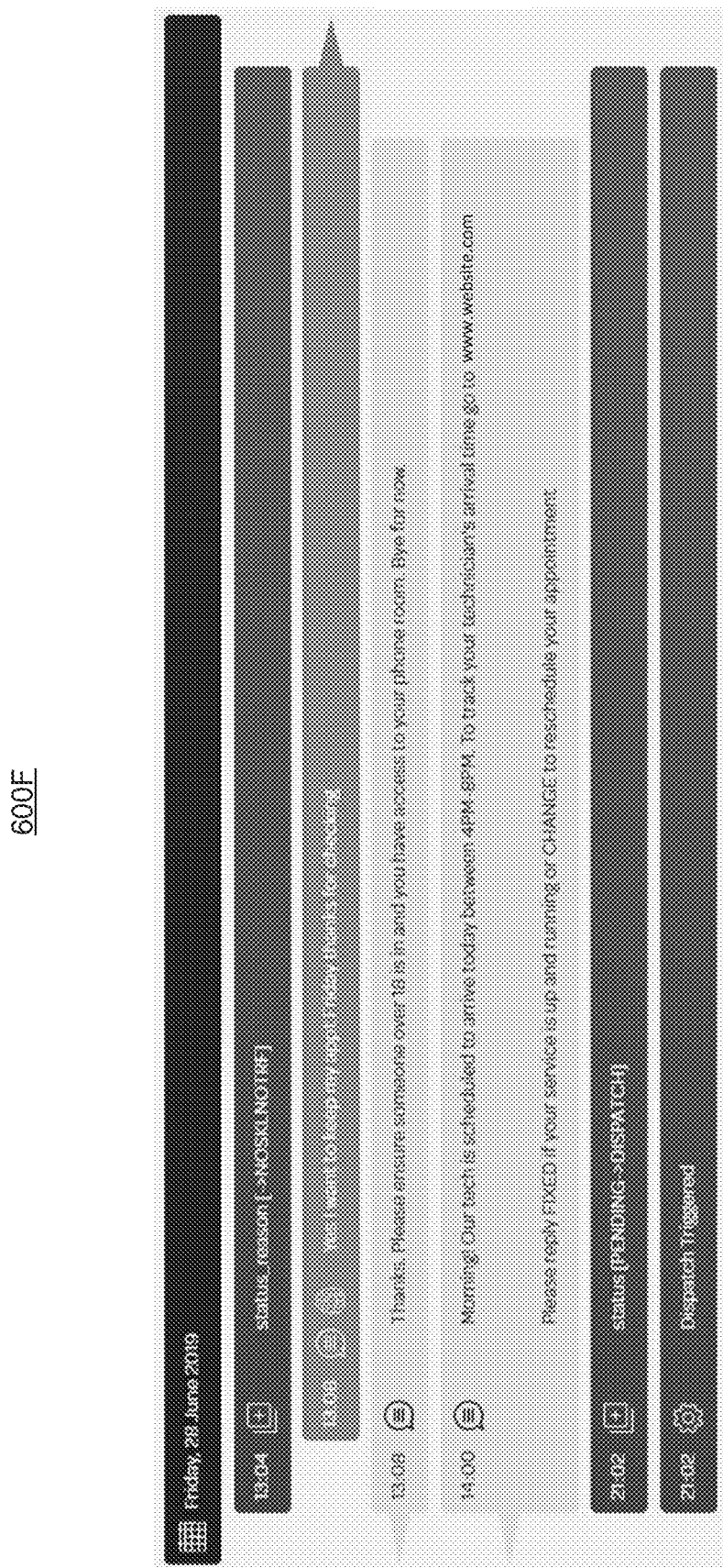
Figure 6G:
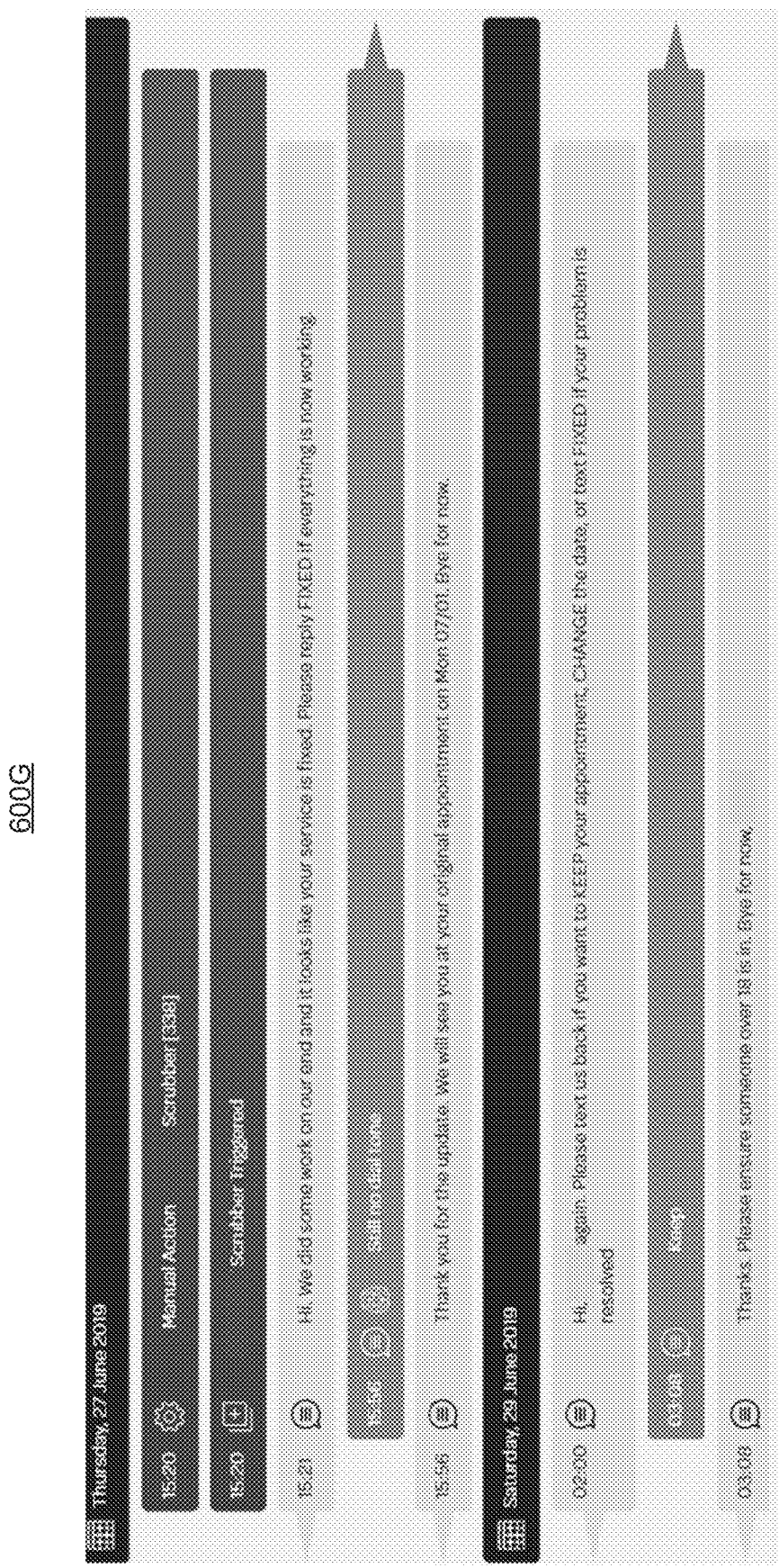
Figure 6H:
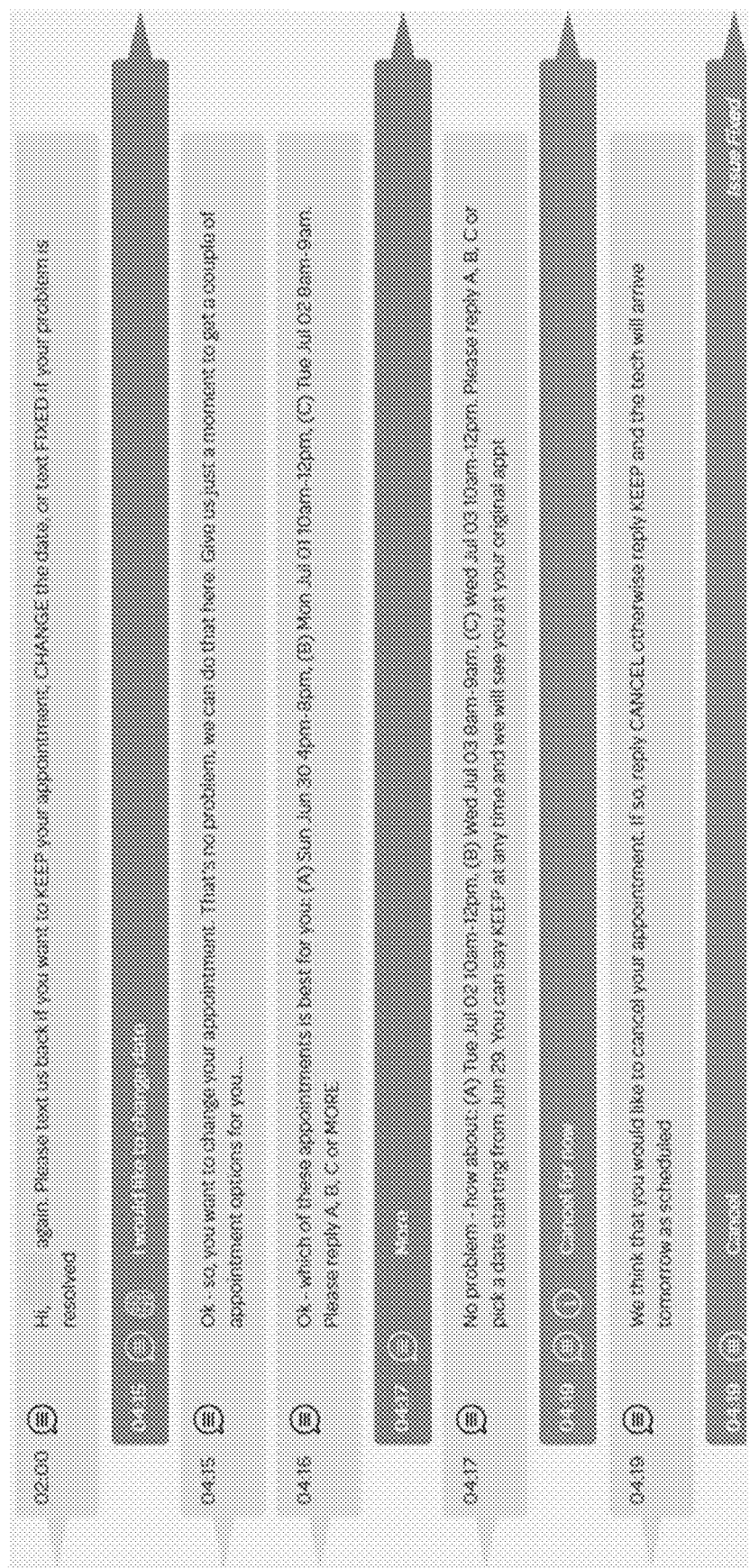
Figure 6I:
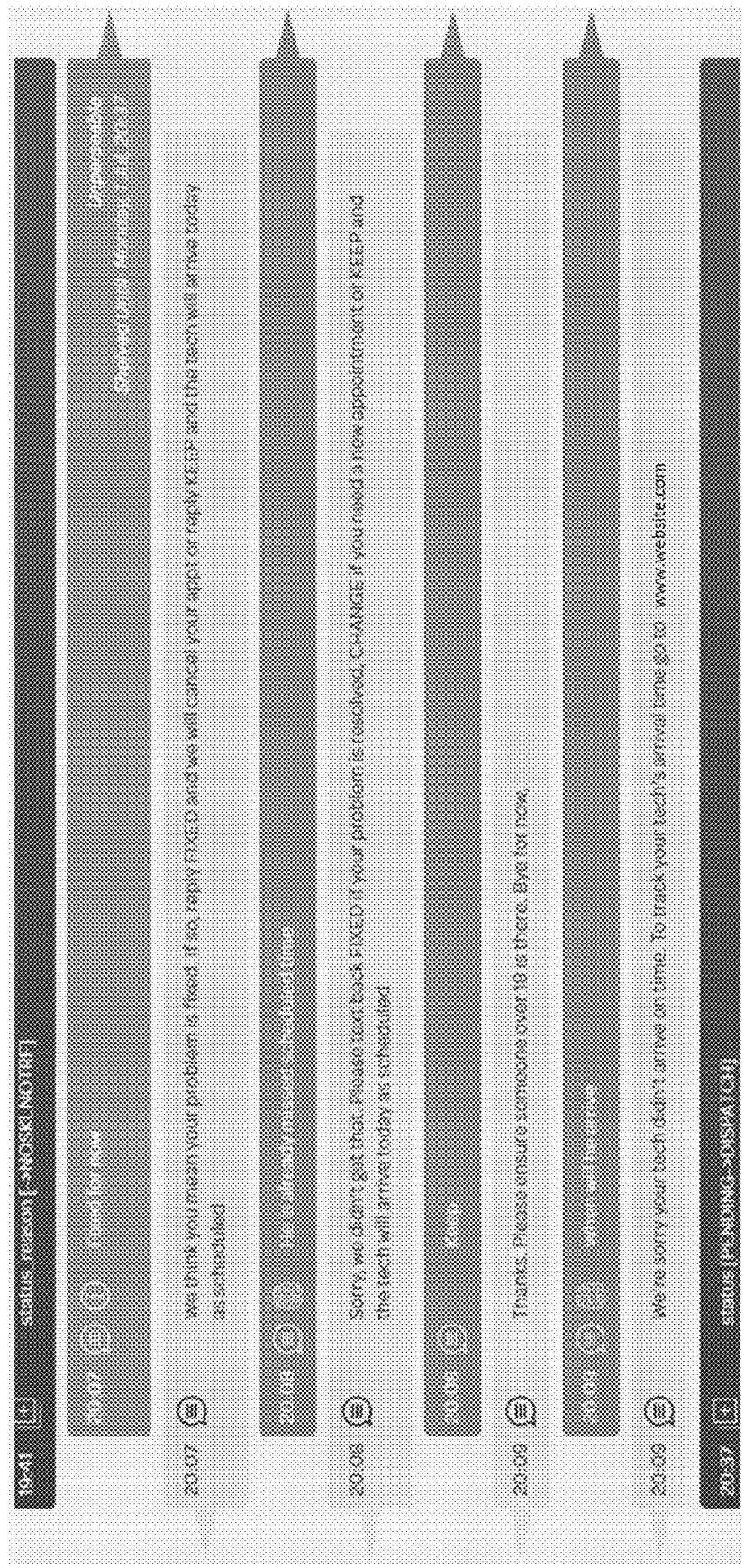

FIG. 5 illustrates a data flow diagram 500 for determining context and intent in omnichannel communications using machine learning based artificial intelligence (AI), according to an example. It should be appreciated that the data flow diagram 500 may be described herein as it relates to the machine learning based artificial intelligence (AI) subsystem 200 of FIG. 2. The data flow diagram may begin with a database that may be provided to store data (e.g., training data) associated with various conversational elements. One or more auxiliary data selection models may be employed to select any unlabeled training data with most significant probable impact on the model. Together with data from the databased, a hierarchical multi-intent data labeling framework may be provided. Here, large initial data volume with a representative distribution selected for data labeling may be provided. It should be appreciated that when a new model is being trained (e.g., fora client that interacts with customers), the machine learning subsystem 200 may compile a representative cut of data from the same point in the system 100 where the AI intent recognition would fit in. This data may then be stripped of PII and labelled internally using our custom data labelling workflow.

In some examples, cloud-distributed hyper-parameter tuning may be provided. Here, labeled data may be used to train a large set of models with different hyper-parameter choices. It should be appreciated that a large random parameter search may take place on a cloud computing cluster, with the resulting models being tested on a development set and the best models being retained. While the choices of parameter may be random, the method may also be configured to restrict ranges of parameters and/or alter their distribution dynamically. In some examples, this may be achieved throughout the process in order to focus more on parameter ranges that give better results.

In some examples, smaller candidate model sets may be retained based on global metric performance. A global numerical metric, as used herein, may be established for each client based on various general performance metrics, such as precision and recall metrics of given intents, importance of identifying particular intents for the given client, etc. An example of this may include assigning specific precision targets to the various intents that the model classifies (e.g., 95% precision for critical intents, 80% precision for other intents, etc.) and then taking a weighted average of the resulting recall scores for that precision. Other various examples may also be provided.

At this point, the candidate models may be further evaluated at a more granular intent level. In some examples, this may be achieved in order to diagnose issues with specific intents. It should be appreciated that evaluating candidate models in this way may be specific to a particular workflow. For example, at this stage, in addition to looking at the chosen global performance metric, various choices for confidence level thresholds for the models and the resultant precision may also be investigated and metrics for each individual intent (e.g., in order to better inform model selection) may be recalled.

Further training data (e.g., selected by auxiliary models) may be added to the training set in order to boost specific intent performance. In this way, a fine-tuning process may be provided. With data oversampling and layer-level fine-tuning techniques applied, any remaining specific intent performance issues may be fixed or augmented. In this way, model layering and additional fine-tuning may help resolve any previously unresolved issues with respect to intent determination. A production-ready model may be obtained as an ensemble of the most successful fine-tuned candidate models, yielding better performance than any of the individual models. It should be appreciated that explainable AI techniques, together with final ensemble model creation, may be used here to help interpret model behavior and diagnose potential issues.

Lastly, the production model may be containerized and deployed on a cloud provider, for example, and the model may then be ready for live intent classification. In some examples, the production model deployment may be cloud-agnostic, where any variety of cloud providers may be used. As described herein, the machine learning based artificial intelligence (AI) subsystem 200 may train the create and train the models for context and multi-intent determination, according to various examples.

FIGS. 6A-6I illustrate screens 600A-600I for determining context and intent in omnichannel communications using machine learning based artificial intelligence (AI), according to an example. As shown in 600A-600B, screens for conversation inventory with a vendor may be provided. There may be planned conversations, event driven conversations, AI driven conversations and various vendor transactions, and a conversation flow with a customer using the intelligent machine learning based artificial intelligence (AI) subsystem 200 for context and multi-intent determination may be provided, as shown in 600B.

In 600C-600I, the conversations may reveal understanding of conversational context and a customer's intent, using various AI-based techniques, such as machine learning, clustering, and/or NLP, to address various concerns (e.g., scheduling issues) of a customer. In some examples, the machine learning based artificial intelligence (AI) subsystem 200 may provide a real-time or near real-time connection to back-end workforce planning applications that may enable presentation of available dates and confirm dates requested. The machine learning based artificial intelligence (AI) subsystem 200 may provide automatic or near-automatic notification of the request timeslot to one or more workforce planning systems, such as CRM or other system. By deducing the customer's intent in a single customer conversational sequence may reduce need for any human intervention, which may be cumbersome and resource-intensive, and immediately allow the customer request to be rescheduled through workforce integration. Other various conversational examples may also be provided, such as non-response, confirmation of appointment, etc.

FIG. 7 illustrates a flow chart of a method for determining context and intent in omnichannel communications using machine learning based artificial intelligence (AI), according to an example. The method 700 is provided by way of example, as there may be a variety of ways to carry out the method described herein. Although the method 700 is primarily described as being performed by system 100 as shown in FIG. 1 and/or system 200 as shown in FIG. 2, the method 700 may be executed or otherwise performed by other systems, or a combination of systems. Each block shown in FIG. 7 may further represent one or more processes, methods, or subroutines, and one or more of the blocks may include machine-readable instructions stored on a non-transitory computer readable medium and executed by a processor or other type of processing circuit to perform one or more operations described herein.

At block 701, a processor of the machine learning based AI subsystem 200 may receive data. In some examples, the data received may be associated with a conversation with a user via a communication channel. In some examples, the data may be for training at least one model to determine intent in the conversation with the user. As described herein, the communication channel may include any number of communication channels, such as telephone, email, simple message service (SMS), mobile device application, video conference, website, digital conversational entity, social network platform, and/or other communication channel.

As described above, the data may be received via a data access interface that receives data from a data source. In some examples, the data source may include a website, a document, enterprise resource planning (ERP) system, a database, a web feed, a sensor, a geolocation data source, a server, an analytics tool, a mobile device, a reporting system, and/or any other data source. In some examples, the conversation may be a multilingual conversation based on the data received from the user or information identifying the user.

Other various examples may also be provided.

At block 702, the processor may select any unlabeled data from the data associated with the conversation from the user. In some examples, the unlabeled data may be selected based on a probability of impacting the at least one model.

At block 703, the processor may provide a hierarchical multi-intent data labeling framework. In some examples, the hierarchical multi-intent data labeling framework may be used for labeling a representative subset of data from at least one of the data associated with the conversation with the user or the selected unlabeled data.

At block 704, the processor may train the at least one model. In some examples, the processor may train the at least one model based on the labeled representative subset of data using a plurality of parameter choices. It should be appreciated that cloud-distributed hyper-parameter tuning and ranges may be used for parameter choices. In some examples, these cloud-distributed hyper-parameter tuning and ranges may be used for parameter choices may be predetermined. It should also be appreciated that the plurality of parameter choices may be searched and selected randomly via a cloud computing cluster to test development sets to determine which of the at least one models to retain.

At block 705, the processor may retain at least one candidate model set from the at least one trained models based on global metric performance. In some examples, global metric performance may be based on at least one global numerical metric established for each client. In some instances, the at least one global numerical metric may include at least one of precision and recall metrics of given intents or importance of identifying particular intents for the given client.

At block 706, the processor may generate a production-ready model. This production-ready model may be generated based on the retained at least one candidate model set. Furthermore, generating the production-ready model may include applying a fine-tune intent level evaluation specific to any particular client workflow. In some examples, this may include providing additional training data from auxiliary models to boost specific intent performance. In some examples, this may include providing data oversampling with layer level fine-tuning techniques to correct or augment specific intent performance issues. In addition, generating the production-ready model may also include creating the production-ready model based on an ensemble of successful fine-tuned candidate models from the at least one retained candidate model set.

At block 707, the processor may deploy the production-ready model for intent determination in the conversation with the user. In some examples, deployment of the production-ready model may be cloud-agnostic.

In this way, a proactive, adaptive, and intelligent approach may be provided to help organizational entities provide omnichannel communications that provide a more intuitive, natural, and pleasant online experience for customers. Furthermore, a more robust and holistic approach for artificial intelligence (AI) based omnichannel communications using machine learning and predictive analysis for determine conversational context and multi-intent of customers may be imperative to overcome the shortcomings of conventional systems and methods What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
a data store to store and to manage data within a network;
a server to facilitate operations using information from the data store;
a machine learning (ML) based artificial intelligence (AI) subsystem to communicate with the server and the data store over the network, the ML-based AI subsystem comprising:
a data access interface to:
receive data associated with a conversation with a user via a communication channel, the data usable for training at least one model to determine intent in the conversation with the user;
a processor to:
select unlabeled data from the data associated with the conversation with the user, the selected unlabeled data having a probability of impacting the at least one model, wherein selecting the unlabeled data comprises:
sampling, using one or more first auxiliary models, the unlabeled data based on the probability that the unlabeled data has on impacting a model performance of the at least one model,
provide a hierarchical multi-intent data labeling framework for labeling a representative subset of data from the data associated with the conversation with the user and the selected unlabeled data;
generate, for the labeled representative subset of data from the data associated with the conversation and the selected unlabeled data based on the hierarchical multi-intent data labeling framework, at least one primary intent and one or more layers of sub-intents for each of the at least one primary intent;
train the at least one model based on the labeled representative subset of data and a plurality of parameter choices;
retain at least one candidate model set from the at least one trained models based on a global metric performance;
generate a production-ready model based on the retained at least one candidate model set; and deploy the production-ready model for intent determination for at least the conversation with the user.

2. The system of claim 1, wherein the communication channel comprises at least one of telephone, email, simple message service (SMS), mobile device application, video conference, website, digital conversational entity, or social network platform.

3. The system of claim 1, wherein the data access interface further receives the data from a data source comprising at least one of a website, a document, enterprise resource planning (ERP) system, a database, a web feed, a sensor, a geolocation data source, an external server, an analytics tool, a mobile device, or a reporting system.

4. The system of claim 1, wherein the conversation is a multilingual conversation based on the data received from the user or information identifying the user.

5. The system of claim 1, wherein cloud-distributed hyper-parameter tuning and ranges for the plurality of parameter choices of the at least one model are predetermined.

6. The system of claim 1, wherein the plurality of parameter choices is searched and selected randomly via a cloud computing cluster to test development sets and determine which of the at least one model to retain as the at least one candidate model set.

7. The system of claim 1, wherein the global metric performance is based on at least one global numerical metric established for each client, and wherein the at least one global numerical metric comprises at least one of precision and recall metric of given intents or importance of identifying particular intents for a corresponding client.

8. The system of claim 1, wherein generating the production-ready model comprises:
applying a fine-tune intent level evaluation specific to a particular client workflow based on at least one of the following:
providing additional training data from one or more second auxiliary models to boost specific intent performance; or
providing data oversampling with a layer level fine-tuning technique configured to correct or augment specific intent performance issues; and
creating the production-ready model based on an ensemble of successful fine-tuned candidate models from the retained at least one candidate model set.

9. The system of claim 1, wherein deploying the production-ready model is cloud-agnostic.

10. A method for determining intent in a digital conversation, comprising:
receiving, by a processor, data associated with a conversation with a user via a communication channel, the data usable for training at least one model to determine intent in the conversation with the user;
selecting, by the processor, unlabeled data from the data associated with the conversation with the user, the selected unlabeled data having probability of impacting the at least one model, wherein selecting the unlabeled data comprises:
sampling, using one or more first auxiliary models, the unlabeled data based on the probability that the unlabeled data has on impacting a model performance of the at least one model,
providing, by the processor, a hierarchical multi-intent data labeling framework for labeling a representative subset of data from the data associated with the conversation with the user and the selected unlabeled data;
generating, by the processor for the labeled representative subset of data from the data associated with the conversation and the selected unlabeled data based on the hierarchical multi-intent data labeling framework, at least one primary intent and one or more layers of sub-intents for each of the at least one primary intent;
training, by the processor, the at least one model based on the labeled representative subset of data and a plurality of parameter choices;
retaining, by the processor, at least one candidate model set from the at least one trained models based on a global metric performance;
generating, by the processor, a production-ready model based on the retained at least one candidate model set; and
deploying, by the processor, the production-ready model for intent determination for at least the conversation with the user.

11. The method of claim 10, wherein the communication channel comprises at least one of telephone, email, simple message service (SMS), mobile device application, video conference, website, digital conversational entity, or social network platform.

12. The method of claim 10, wherein the data is received from a data source comprising at least one of a website, a document, enterprise resource planning (ERP) system, a database, a web feed, a sensor, a geolocation data source, a server, an analytics tool, a mobile device, or a reporting system.

13. The method of claim 10, wherein the conversation is a multilingual conversation based on the data received from the user or information identifying the user.

14. The method of claim 10, wherein cloud-distributed hyper-parameter tuning and ranges for the plurality of parameter choices of the at least one model are predetermined.

15. The method of claim 10, wherein the plurality of parameter choices is searched and selected randomly via a cloud computing cluster to test development sets and determine which of the at least one model to retain as the at least one candidate model set.

16. The method of claim 10, wherein the global metric performance is based on at least one global numerical metric established for each client, and wherein the at least one global numerical metric comprises at least one of precision and recall metric of given intents or importance of identifying particular intents for a corresponding client.

17. The method of claim 10, wherein generating the production-ready model comprises:
applying a fine-tune intent level specific to a particular client workflow based on least one of the following:
providing additional training data from one or more second auxiliary models to boost specific intent performance; or
providing data oversampling with a layer level fine-tuning technique configured to correct or augment specific intent performance issues; and
creating the production-ready model based on an ensemble of successful fine-tuned candidate models from the retained at least one candidate model set.

18. The method of claim 10, wherein deploying the production-ready model is cloud-agnostic.

19. A non-transitory computer-readable storage medium having an executable stored thereon, which when executed instructs a processor to perform the following:
receiving data associated with a conversation with a user via a communication channel, the data usable for training at least one model to determine intent in the conversation with the user;

selecting unlabeled data from the data associated with the conversation with the user, the selected unlabeled data having probability of impacting the at least one model wherein selecting the unlabeled data comprises:
sampling, using one or more first auxiliary models, the unlabeled data based on the probability that the unlabeled data has on impacting a model performance of the at least one model, providing a hierarchical multi-intent data labeling framework for labeling a representative subset of data from the data associated with the conversation with the user and the selected unlabeled data;

generating, for the labeled representative subset of data from the data associated with the conversation and the selected unlabeled data based on the hierarchical multi-intent data labeling framework, at least one primary intent and one or more layers of sub-intents for each of the at least one primary intent;

training the at least one model based on the labeled representative subset of data using a plurality of parameter choices;

retaining at least one candidate model set from the at least one trained models based on a global metric performance;

generating a production-ready model based on the retained at least one candidate model set; and deploying the production-ready model for intent determination for at least the conversation with the user.

20. The non-transitory computer-readable storage medium of claim 19, wherein generating the production-ready model comprises:
applying a fine-tune intent level evaluation specific to a particular client workflow based on at least one of the following:
providing additional training data from one or more second auxiliary models to boost specific intent performance; or
providing data oversampling with a layer level fine-tuning technique configured to correct or augment specific intent performance issues; and
creating the production-ready model based on an ensemble of successful fine-tuned candidate models from the retained at least one candidate model set.

* * * * *